United States Patent [19]

Cole et al.

[11] Patent Number: 5,066,522

[45] Date of Patent: * Nov. 19, 1991

[54] SUPERCRITICAL FLUIDS AS DILUENTS IN LIQUID SPRAY APPLICATIONS OF ADHESIVES

[75] Inventors: Thomas A. Cole, New Fairfield, Conn.; Kenneth A. Nielsen, Charleston, W. Va.

[73] Assignee: Union Carbide Chemicals and Plastics Technology Corporation, Danbury, Conn.

[*] Notice: The portion of the term of this patent subsequent to May 8, 2007, has been disclaimed.

[21] Appl. No.: 326,945

[22] Filed: Mar. 22, 1989

Related U.S. Application Data

[63] Continuation-in-part of Ser. No. 218,910, Jul. 14, 1988.

[51] Int. Cl.$^5$ .............................................. B05D 1/02
[52] U.S. Cl. .................................. 427/422; 427/385.5
[58] Field of Search .................. 118/300, 302; 427/27, 427/421, 422, 426, 384, 385.5; 239/9, 10, 299, 128, 597, 599, 432, 343, DIG. 1

[56] References Cited

U.S. PATENT DOCUMENTS

| | | | |
|---|---|---|---|
| 4,124,528 | 11/1978 | Modell | 252/411 R |
| 4,189,914 | 2/1980 | Marek et al. | 60/726 |
| 4,375,387 | 3/1983 | deFilippi et al. | 202/169 |
| 4,582,731 | 4/1986 | Smith | 427/421 |
| 4,619,735 | 10/1986 | Norton | 162/135 |
| 4,734,227 | 3/1986 | Smith | 264/13 |
| 4,734,451 | 3/1986 | Smith | 118/300 X |
| 4,737,384 | 4/1988 | Murthy et al. | 427/369 |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec. 1954.

Smith, R. D., et al., "Direct Fluid Injection Interface for Capillary Supercritical Fluid Chromatography-Mass Spectrometry", J. Chromatog. 247(1982): 231-243.

Krukonis, V., "Supercritical Fluid Nucleation of Difficult-to-Comminute Solids", paper presented at 1984 Annual Meeting, AICHE, San Francisco, Calif., 11/25-30/84.

Dandage, D. K., et al., "Structure Solubility Correlations: Organic Compounds and Dense Carbon Dioxide Binary Systems", Ind. Eng. Chem. Prod. Res. Dev. 24: 162-166 (1985).

Matson, D. W., et al., "Production of Powders and Films by the Rapid Expansion of Supercritical Solutions", J. Materials Science 22: 1919-1928 (1987).

McHugh, M. A. et al., "Supercritical Fluid Extraction, Principles and Practice", Butterworth Publishers (1986), Contents and Appendix.

Matson, D. W. et al., "Production of Fine Powders by the Rapid Expansion of Supercritical Fluid Solutions", Advances in Ceramics, vol. 21, pp. 109-121 (1987).

Kitamura, Y., et al., "Critical Superheat for Flashing of Superheated Liquid Jets", Ind. Eng. Chem. Fund., 25:206-211 (1986).

Peterson, R. C. et al., "The Formation of Polymer Fibers From the Rapid Expansion of SCF Solutions", Pol. Eng. & Sci. (1987), vol. 27, p. 169.

Cobbs et al., "High Solids Coatings Above 80% by Volume", pp. 175-192; presented at Water-Borne and Higher Solids Coatings Symposium, Mar. 10-12, 1980.

Primary Examiner—Shrive Beck
Assistant Examiner—Alain Bashore
Attorney, Agent, or Firm—Morris N. Reinisch

[57] ABSTRACT

The present invention relates to precursor adhesive coating compositions which optionally contain water, which are particularly suitable for being admixed with at least one supercritical fluid used as a viscosity reduction diluent and then spraying this resultant liquid mixture of supercritical fluid and precursor adhesive coating composition onto a substrate to be coated. Processes for spraying these precursor adhesive coating compositions are also disclosed.

74 Claims, 4 Drawing Sheets

SUPERCRITICAL FLUIDS AS DILUENTS IN LIQUID SPRAY APPLICATIONS OF ADHESIVES

This application is a continuation-in-part of application Ser. No. 218,910, filed July 14, 1988.

RELATED PATENT APPLICATIONS

This application contains subject matter related to Ser. No. 133,068, filed Dec. 21, 1987 now abandoned, which is a continuation-in-part of application Ser. No. 883,156, filed July 8, 1986, now abandoned. This application also contains subject matter related to U.S. Pat. applications Ser. No. 218,896 now abandoned, filed July 14, 1988.

FIELD OF THE INVENTION

This invention, in general, pertains to the field of adhesive compositions and their applications onto substrates by spraying techniques. More specifically, the present invention is directed to processes and apparatus for applying adhesives to substrates in which a supercritical fluid, such as supercritical carbon dioxide fluid, is used as a viscosity reduction diluent during the application of such adhesive onto the substrate. So too, the present invention relates to precursor adhesive compositions which are particularly suitable for being admixed with at least one supercritical fluid used as a viscosity reduction diluent. The resultant admixed liquid mixture of supercritical fluid and precursor adhesive composition can then be sprayed onto a substrate to be coated with such adhesive.

BACKGROUND OF THE INVENTION

Most simplistically, adhesives are used to bond, whether temporarily or permanently, one or more materials together. Thus, for example, thin films, fibers or small particles that cannot readily be combined, if at all, by other techniques, are readily bonded with adhesives. Typical of such applications include glass wool insulation, fiberglass mat composites, abrasive wheels, sandpaper, emory cloth, and the like.

So too, as a result of using adhesives, stresses are desirably distributed over wider areas, making possible lighter and stronger assemblies than could be achieved with mechanical fastening. For example, airplane wings, tails, and fuselages may be constructed of sandwich panels comprising a honeycomb core bonded to thin faces of aluminum or magnesium, consequently the possibility of fatigue failure is decreased.

Moreover, as a result of adhesive bonding, the strength-to-weight ratios and dimensional stability of anisotropic materials can be improved. As an example, wood, which inherently is non-uniform and water-sensitive, may be converted into a warp-resistant, water-resistant plywood. Nonwoven fabrics having the same properties in all directions are also made by bonding a random web of fiber.

Other advantages of using adhesive bonding in lieu of other methods of joining materials are well known to those skilled in the art. As a result, more and more applications are being found for the utilization of adhesives and, consequently, the use of adhesives is ever increasing.

However, a large portion of the adhesives used in industry today utilize organic solvents and/or non-aqueous diluents to act as viscosity reducers so as to enable these adhesives to be applied to the substrates by various application techniques. Because of increased environmental concern, however, efforts have begun to reduce the pollution resulting from industrial operations, particularly to reducing the amount of organic solvent vapors and non-aqueous diluent vapors entering the atmosphere.

While the primary focus to diminish the emission of such organic solvent vapors and volatile non-aqueous diluent vapors is currently upon the painting and finishing operations, it is just a matter of time before such focus is directed to other operations, such as the application of adhesives.

While there are water-borne adhesive compositions which can be used in lieu of solvent-borne adhesives, such water-borne adhesives are generally limited to particular end uses and applications and are typically less resistant to corrosive environments than are the more conventional solvent-borne adhesive systems.

Moreover, there are adhesive materials which simply do not lend themselves to being used in a water-borne system but which are particularly desirable for specific end use applications and would therefore still require that the medium by which they are applied to substrates be a solvent-borne system. So too, certain classes of adhesives, such as epoxide adhesives, while not requiring a solvent per se, nevertheless require curing agents in order to set these epoxide resins which curing agents also contribute to atmospheric pollution.

Simply reducing the amount of organic solvent, non-aqueous diluent, and/or curing agent may solve the pollution problem, but introduces new problems as to the ability of handling these compositions, applying such compositions to the substrate, such as by spraying, and may even affect the shelf stability, and the curing and/or crosslinking rate or even require higher temperatures to effect an adequate adhesive onto the substrate.

Moreover, water-borne adhesives also suffer from the disadvantages of being subject to freezing, undesirably affecting some of the substrates to which they are applied, such as shrinking fabrics, or wrinkling and curling paper, and may be contaminated by some metals used for storage and application.

While adhesives may be applied to a substrate by various means, such as by brushing, rolling, dipping, and the like, where possible, it is generally more desirable to spray the adhesive composition where the particular adhesive composition, its viscosity and the specific end use permit. Spraying the adhesive composition is particularly desirable when applying an adhesive to substrates such as paper, cardboard, wood, leather, plastic and cloth.

However, by reducing the organic solvent and/or non-aqueous diluent that is present in a sprayable adhesive composition, the viscosity of such a composition generally increases to a point such that it can no longer be sprayed or, if sprayable, the adhesive layer that is applied onto the substrate would not have enough solvent present to allow for sufficient flow-out if a uniform, substantially continuous adhesive coating were desired.

Clearly, at least in the spray application of adhesive compositions, what is needed is an environmentally safe, non-polluting diluent that can be used to thin very highly viscous polymeric adhesive coating compositions to liquid spray application consistency. Such a diluent would allow utilization of the best aspects of organic solvent-borne adhesive applications and performance while reducing the environmental concerns to an acceptable level. Such an adhesive system could meet the requirements of shop- and field-applied liquid spray adhesive coatings as well as factory-applied adhesive coatings and still be in compliance with environmental regulations.

By virtue of the present invention, such a needed diluent has now been found. By the utilization of supercritical fluids, such as supercritical carbon dioxide fluid, as diluents in highly viscous organic solvent-borne and/or highly viscous non-aqueous dispersion adhesive coating compositions, it is now possible to dilute these compositions to application viscosity required for liquid spray techniques.

In addition to the above noted advantage, namely, being able to reduce the amount of environmental pollution caused by the use of volatile solvents, the utilization of supercritical fluids to act as a diluent with adhesive compositions intended for spray application provides yet even further significant advantages.

Specifically, for example, once an adhesive composition is applied to the substrate to be coated, the organic solvents and/or non-aqueous diluents must generally then be removed. Porous substrates, such as paper, permit the liquid solvent and/or diluent to be drawn away from the glue layer. If, however, both adherends are impermeable it is then necessary to evaporate the solvent before mating the two surfaces that are to be bonded, thereby slowing production. Clearly, by the utilization of a supercritical fluid, the amount of such volatile solvent and/or diluent can be significantly reduced thereby reducing, in turn, any problems that may be associated with the removal of such solvent and/or diluent from the coated substrate.

Furthermore, adhesive compositions exist whose properties are such that they entrap solvents and/or diluents and thereby retard subsequent curing. This generally tends to reduce the ultimate cohesive strength of the bonded composite. Here again, by the use of supercritical fluids, which are used to replace a significant portion of such volatile solvents and/or diluents, this problem too is materially reduced.

Yet another example in which the addition of supercritical fluids would be advantageous for reasons other than its impact on environmental pollution is its ability to improve the quality of the spraying application itself. Particularly, it is not uncommon for both cobwebbing and stringing to manifest itself during the spraying of adhesive compositions. However, by virtue of the present invention in which supercritical fluids would be present during the spraying application of such adhesive compositions, such spraying would now be characterized by more explosive atomization caused by the presence of the supercritical fluids thereby significantly reducing, if not entirely eliminating, such undesirable cobwebbing and stringing.

Accordingly, it is clear that the utilization of supercritical fluids with sprayable adhesive coating compositions in accordance with the present invention provides a number of significant advantages, those noted above merely just being exemplary. The utilization of supercritical fluid not only dramatically decreases the amount of organic solvent and/or non-aqueous diluent that needs to be present in an adhesive formulation but, moreover, helps to significantly reduce the spraying and/or adhesive coating formation problems that have been experienced in this art.

In this connection, it is understood that the present invention is particularly suitable for those adhesive coating compositions which have heretofore been applied by spraying techniques. However, the present invention is not limited to such compositions. Indeed, adhesive coating compositions which heretofore have not been able to be sprayed due to their high viscosities may now very well be sprayed by being admixed with supercritical fluids in accordance with the present invention.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

In Japanese Patent Application No. SHO 57/1982-52890 (Publication No. SHO 58/1983-168674), there is disclosed an adhesive composition for spraying comprising an $\alpha$-cyano acrylate type adhesive which is dissolved in liquified carbon dioxide gas such that the adhesive composition is in a liquid state and maintained at room temperature in a pressurized vessel. When sprayed into atmospheric pressure, it assumes a powder, snow-like form having particle diameters in the range of between one and several microns. Only the $\alpha$-cyano acrylate adhesive contacts the substrate to be bonded with essentially all of the powder, snow-like dry ice having sublimated. Moisture from the air that has condensed on the snow-like powdered particle surfaces of the dry ice is allowed to remain together with the $\alpha$-cyano acrylate and it acts to promote the adhesion effect of the $\alpha$-cyano acrylate onto the substrate.

Sprayable adhesive coating formulations are commonly applied to a substrate by passing the adhesive formulation under pressure through an orifice into air in order to form a liquid spray, which impacts the substrate and forms a liquid adhesive coating. In the adhesive coatings industry, three types of orifice sprays are commonly used; namely, air spray, airless spray, and air-assisted airless spray.

Air spray uses compressed air to break up the liquid adhesive coating formulation into droplets and to propel the droplets to the substrate. The most common type of air nozzle mixes the adhesive coating formulation and high-velocity air outside of the nozzle to cause atomization. Auxiliary air streams are used to modify the shape of the spray. The adhesive coating formulation flows through the liquid orifice in the spray nozzle with relatively little pressure drop. Siphon or pressure feed, usually at pressures less than 18 psi, are used, depending upon the viscosity and quantity of adhesive coating formulation to be sprayed.

Airless spray uses a high pressure drop across the orifice to propel the adhesive coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid adhesive coating composition heated or with the air heated or with both heated. Heating reduces the viscosity of the liquid adhesive coating formulation and aids atomization.

In general, adhesive coating compositions that are intended for spray application may be formulated to help provide optimum spraying characteristics (e.g., minimization of cobwebbing or stringing) as well as optimum adhesion properties after the adhesive coating composition has been sprayed by any of the above means onto a substrate and then dried and/or cured. Some of the defects that may occur on the substrate coated with the adhesive include, but are certainly not limited to, the types noted earlier, such as insufficient solvent evaporation, improper curing, and the like, all of which are well known to those skilled in this art.

Obviously, none of the prior art adhesive coating compositions intended for spray application have been formulated with the intent of having such compositions combined with a supercritical fluid as a diluent and then spraying the resultant admixed liquid mixture through an orifice and onto a substrate to form a liquid coating which is then dried and/or cured.

Indeed, prior to the present invention and the inventions described in the above-noted related applications, it was unknown how a high concentration of highly volatile supercritical fluid, such as supercritical carbon dioxide fluid, would affect formation of a liquid spray containing a solids fraction; a diluent fraction in which said solids fraction is dissolved, suspended or dispersed, and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that one could theorize is that the spray mixture would produce a spray of bubbles instead of droplets. Furthermore, even if a spray were formed, one of ordinary skill in the art could expect that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coherent polymeric coatings on a substrate. One of ordinary skill in the art could surmise that the liquid droplets would be so small or have so little momentum that they could not be deposited well onto the substrate. One could also theorize that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. Furthermore, the coating material would contain less volatile organic solvent than normal. Therefore, it in not unreasonable to expect that higher viscosity would prevent or hinder coalescence of the deposited droplets to form a coherent liquid coating; that it would reduce how much the droplets spread out on the substrate, so that thin adhesive coatings could not be produced; and that it would reduce the surface flow that produces a smooth coating, if such were desired. One can further theorize that moisture would condense onto the droplets and harm the coating, because the spray would be cooled below the dew point.

Surprisingly, however, it has been discovered that liquid sprays can indeed be formed by using supercritical fluids as viscosity reduction diluents and that such sprays can be used to deposit quality coherent adhesive polymeric coatings onto substrates.

Moreover, however, after admixing the highly viscous organic solvent-borne and/or highly viscous non-aqueous dispersions adhesive coating compositions with supercritical fluids as a diluent to help reduce the viscosity, it may still be desirable to reduce the viscosity even further but keep the overall amount of supercritical fluid used substantially the same. Alternatively, it may also be desirable to maintain (or lower) the viscosity of the admixed adhesive coating composition and maintain the overall amount of supercritical fluids used substantially the same, but still want to reduce even further the amount of organic solvent in the admixed coating composition.

More specifically, there may be adhesive coating compositions whose initial viscosity is so high that the amount of supercritical fluids that can be admixed with such compositions, without undesirably causing a two phase separation, is insufficient to reduce the viscosity to the point where such composition can properly be sprayed.

Alternatively, since it is known that high molecular weight polymers generally provide adhesive coatings having better adhesive bonding characteristics as well as better solvent resistance, it may be desirable to use such a high molecular weight polymer in an adhesive coating composition in lieu of a similar but lower molecular weight polymer that may be used in order to provide a manageable viscosity suitable for spraying. However, the use of such a high molecular weight polymer introduces an increase in the overall viscosity of the adhesive composition. This increase in viscosity may be such that the amount of supercritical fluids now needed to reduce the viscosity of the composition to a point suitable for spray application may not be obtainable without breaking up the composition into two phases.

Still further, for a given highly viscous adhesive coating composition containing a particular amount of polymeric component and an organic or non-aqueous solvent, respectively, it may be desirable to reduce the amount of such volatile solvents even further. Of course, such a reduction in solvent would inherently result in a corresponding increase in the overall viscosity of the coating composition. Here again, the increase in viscosity may be such that the amount of supercritical fluids needed to now reduce the viscosity of the composition to a point suitable for spray application may not be obtainable.

Clearly, a need also exists to be able to accomplish all of the above objectives as well. Preferably, these objectives should be able to be carried out without the necessity of adding supercritical fluid in an amount which is greater than that originally needed, such that the expected diluent effect of the supercritical fluids can be expected to remain substantially about the same. Of course, if desired, more than the original amount of supercritical fluid may be used, if such amount does not cause the excessive breakup of the composition into two phases.

Accordingly, the present invention provides a means by which the above noted goals may be achieved and, more particularly, provides precursor adhesive coating compositions in which those goals have been manifested.

Still further, a need also exists to provide precursor adhesive coating compositions which in addition to achieving the above objectives are also formulated to:

(a) be particularly compatible for subsequent admixture with a supercritical fluid diluent;

(b) be particularly suitable, once admixed with the supercritical fluid, to help minimize any of the phenomena that may occur which are peculiarly associated with the utilization of such supercritical fluid, which phenomena may interfere with proper atomization of the admixed liquid mixture and/or proper diffusion of the supercritical fluid once atomized; and (c) provide desirable adhesive coating characteristics such that once sprayed onto a substrate, it will (i) help provide the necessary coalescence of the deposited droplets to form a coherent liquid coating film or (ii) help provide the necessary properties for obtaining a droplet pattern on a substrate, while still helping to minimize any of the other defects noted above and at the same time, still allow for the release of any residual supercritical fluid that may be present after the adhesive coating has been applied to the substrate.

As used herein, a "liquid adhesive coating" is meant to include a substantially uniform, continuous film formed on the substrate that has been sprayed or, alternatively, a discontinuous, random, liquid droplet pattern that is applied to the substrate.

Accordingly, the precursor adhesive coating compositions of the present invention not only fulfill the goals of (1) having an even lower viscosity and/or (2) having even less organic solvent, but they are also particularly suitable for subsequent admixture with at least one supercritical fluid which admixture is then sprayed through an orifice, such as airless spray or air-assisted airless spray methods, to apply an admixed adhesive coating composition onto a substrate. Advantageously, the coatings have desirable bonding characteristics and a desirable predetermined coating pattern, i.e., whether continuous or discontinuous.

It has unexpectedly been found that water may actually be added to an organic solvent-borne adhesive coating composition such that when admixed with supercritical fluids, the water acts as an additional viscosity reduction diluent providing a composition having an even lower viscosity. Most importantly, however, the amount of supercritical fluids that are miscible with this water-containing coating composition remains at least substantially the same as in the composition in which no water is present.

This discovery is quite surprising in that it has been found that materials such as liquid carbon dioxide or supercritical carbon dioxide are only sparingly miscible with water or water-borne polymer mixtures. Yet, when in the presence of at least one organic coupling solvent, quite surprisingly, a relatively large amount of water may be added to the organic solvent-borne coating composition under supercritical conditions while still retaining the supercritical fluid miscibility characteristics of the original composition. In general, up to about 30 percent by weight of water, based on the total weight of solvent/diluent present in the composition, may be added with substantially no reduction in the amount of supercritical fluid contained in the composition.

Accordingly, in the illustration noted earlier in which not enough supercritical fluid could be added to a viscous adhesive coating composition so as to reduce its viscosity to a point suitable for spraying, this problem can now be solved by simply adding enough water to the composition (up to about 30 percent by weight of the total solvent/diluent present), so as to reduce the initial viscosity of the composition, while still keeping the amount of supercritical fluid that is capable of being admixed with the composition the same. In other words, the addition of the water to the composition serves to act as a further diluent to reduce the viscosity of the composition but does not substantially reduce the miscibility of the now water-containing composition with the supercritical fluids. Most importantly, such a viscosity reduction is achieved without adding organic solvent over and above that which was originally present. While a coupling solvent is desirably added to the composition in conjunction with the water addition, as will be more fully discussed hereinbelow, such coupling solvent may be used to replace some or all of the organic solvent present in the original composition such that the total amount of organic solvent in the water-containing composition is less than or equal to the amount contained in the original composition. With such a viscosity reduction in the new water-containing composition, the amount of supercritical fluids that can be admixed with this composition is generally enough to reduce the viscosity further to a point suitable for spraying.

Similarly, in the illustration noted above in which it would be desirable to replace a low molecular weight polymer with a similar polymer having a higher molecular weight, but the amount of supercritical fluids that can be added to the new formulation cannot be increased to compensate for the increase in viscosity, that too can now be accomplished by adding water to the system. The water acts as a further diluent, and in conjunction with the supercritical fluids (the total amount of which remains substantially the same in both the original composition and in the composition containing water), the viscosity of the reformulated composition containing the higher molecular weight polymer is now reduced to the point that the amount of supercritical fluids that can be admixed with the composition is now enough to reduce the viscosity to a point at which it can be sprayed.

Most significantly, in contrast to the above two illustrations in which water is typically added to a composition so as to actually increase the overall amount of solvent/diluent that is present, the present invention has also recognized that water may also be used to actually replace some of the organic solvent in the original composition. In this manner, while keeping the overall amount of solvent/diluent in the composition substantially about the same, it is possible to reduce even further the amount of volatile organic or non-aqueous solvent that is present in the coating composition so as to accommodate, if needed, the ever increasingly stringent guidelines that are being imposed.

Of course, the present invention recognizes that it is not necessary to start with one adhesive composition formulation and then modify it by the addition of water. The present invention clearly encompasses within its scope the formulation of an initial adhesive coating composition which is formulated with water in accordance with the present invention.

SUMMARY OF THE INVENTION

By virtue of the present invention, adhesive coating compositions can now be formulated and sprayed having a substantially reduced amount of volatile solvents contained therein thereby significantly reducing undesirable environmental pollution.

More particularly, in accordance with the present invention, a totally new approach to the use of viscosity reduction diluents has been discovered which involves the use of supercritical fluids to act as viscosity reducing diluents during the spraying process to dilute adhesive coating compositions containing a significantly lower amount of volatile solvents and a concomitantly high viscosity such that the adhesive composition, after having been admixed with the supercritical fluid, now has a viscosity which is suitable for liquid spray application. Accordingly, precursor adhesive coating compositions may now be prepared which are intended for subsequent admixture with supercritical fluids for spray application techniques desirably containing reduced amounts of volatile solvents which have heretofore been required in order to provide the viscosity necessary for such spray application.

Still further, the present invention is also directed to adhesive coating compositions which are intended for admixture with at least one supercritical fluid and then subsequently sprayed onto a substrate as a liquid coating, particularly adhesive coating compositions containing water and organic solvent in accordance with an alternative embodiment of the present invention, and formulated so as to provide such adhesive coating compositions with physical and/or chemical characteristics which make them eminently suitable for such intended use.

In particular, by optimizing one or more specific physical and/or chemical properties of the adhesive coating composition, a number of factors influencing and affecting the overall coating process, which includes the utilization of a supercritical fluid, are significantly improved. Such factors include, but are not limited to, for example, (1) the ease with which the supercritical fluid is admixed with such compositions; (2) the amount of supercritical fluid that is capable of being admixed with the composition while still desirably maintaining a single phase; (3) the ease with which the resulting liquid admixture is sprayed; (4) the quality of the atomized spray droplets that are produced; (5) the ability of the supercritical fluid to rapidly diffuse from the atomized sprayed droplets; (6) the ability of the atomized liquid droplets to be deposited efficiently onto the substrate; (7) the ability of the atomized liquid droplets, once applied to the substrate, to sufficiently coalesce and form a coherent liquid adhesive coating when a uniform, continuous adhesive film is desired to be formed; (8) the ability of the atomized liquid droplets, once applied to the substrate, to retain their random, discontinuous droplet pattern and not coalesce, where such a pattern is desired; (9) the ability for any residual supercritical fluid still remaining in the liquid coating applied to the substrate to effectively diffuse and escape; (10) the ability to help form an adhesive coating free from entrapped solvents; and the like, all of which are affected, at least in part, by the characteristics of the adhesive precursor coating composition.

It is recognized that variables other than the adhesive coating composition per se may have an affect on some or all of the above noted factors. For example, the spray temperature, the spray pressure, the particular supercritical fluid being used, the amount of supercritical fluid admixed with the precursor coating composition, the temperature and pressure of the environment in which the substrate is present, the distance between the spray orifice and the substrate, and the like, all have an affect upon the spraying process and the adhesive coating results that are obtained. Generally, however, assuming that all of such process variables are kept constant, the formulation of the precursor adhesive coating composition will still play a significant role in the overall spraying process and the resulting adhesive coating that is obtained.

In particular, in its broader aspects the invention comprises an adhesive precursor coating composition comprising a liquid mixture of:

(a) a solids fraction containing at least one polymeric compound capable of forming an adhesive coating on a substrate; and (b) a solvent fraction containing at least one active solvent in which said at least one polymeric compound is at least partially soluble;

said liquid mixture having:

(i) a viscosity of less than about 6000 centipoise and having less than about 650 grams of the solvent fraction per liter of mixture;

(ii) a solubility with at least one supercritical fluid, above the critical temperature and pressure of the supercritical fluid, of greater than 5% by weight of supercritical fluid in said mixture;

(iii) a viscosity of less than about 300 centipoise when admixed with a sufficient amount of the at least one supercritical fluid, above the critical temperature and pressure of the supercritical fluid, so as to render the mixture suitable for spray application; and (iv) a solubility with the supercritical fluid in the non-supercritical state, at 25° C. and one atmosphere absolute pressure of said fluid, of less than about 0.8% by weight of fluid in said mixture.

As used herein, the "critical temperature" is defined as the temperature above which a gas cannot be liquefied by an increase in pressure. Similarly, as used herein, the "critical pressure" is defined as that pressure which is just sufficient to cause the appearance of two phases at the critical temperature.

The invention is also directed in an alternative embodiment to precursor adhesive coating compositions to which water is added to act as an additional viscosity reducing diluent where it is desired to reduce the amount of volatile solvents even further. This embodiment comprises a liquid mixture of:

(a) a solids fraction containing at least one polymeric compound capable of forming an adhesive coating on a substrate; and (b) a solvent fraction containing at least one active solvent in which said polymeric compound is at least partially soluble and which is at least partially miscible with the supercritical fluid and containing at least one coupling solvent in which said at least one polymeric compound is at least partially soluble and which is at least partially miscible with water; and (c) water, which is present in an amount of less than about 30% by weight based on the weight of the solvent fraction;

said liquid mixture having:

(i) a viscosity of less than about 6,000 centipoise and having less than about 650 grams of the solvent fraction per liter of mixture;

(ii) a solubility with at least one supercritical fluid, above the critical temperature and pressure of the supercritical fluid, of greater than 5% by weight of supercritical fluid in said mixture;

(iii) a viscosity of less than about 300 centipoise when admixed with a sufficient amount of the at least one supercritical fluid, above the critical temperature and pressure of the supercritical fluid, so as to render the mixture suitable for spray application; and (iv) a solubility with the supercritical fluid in the non-supercritical state, at 25° C. and one atmosphere absolute pressure of said fluid, of less than about 0.8% by weight of fluid in said mixture.

Still further, the present invention is also directed to processes for the liquid spray application of the coatings discussed above to a substrate wherein the use of environmentally undesirable volatile organic solvents and non-aqueous diluents may even further be diminished. Accordingly, one process embodiment of the present invention comprises:

(a) forming a liquid mixture in a closed system, said liquid mixture comprising:

(i) a solids fraction containing: at least one polymeric compound capable of forming an adhesive coating on a substrate;

(ii) a solvent fraction containing at least one active solvent in which said at least one polymeric compound is at least partially soluble and which is at least partially miscible with supercritical fluid; and (iii) at least one supercritical fluid, in at least an amount which when added to (i) and (ii) is sufficient to render the viscosity of said mixture to a point suitable for spray application; and (b) spraying said liquid mixture onto a substrate to form a liquid coating thereon.

In an alternative embodiment, in which water is present in the precursor adhesive coating composition, the process comprises:

(a) forming a liquid mixture in a closed system, said liquid mixture comprising:

(i) a solids fraction containing at least one polymeric compound capable of forming an adhesive coating on a substrate;

(ii) a solvent fraction containing at least one active solvent in which said polymeric compound is at least partially soluble and which is at least partially miscible with the supercritical fluid of (iv) and containing at least one coupling solvent in which said at least one polymeric compound is at least partially soluble and which is at least partially miscible with water;

(iii) water, which is present in an amount of less than about 30% by weight based on the weight of the solvent fraction; and (iv) at least one supercritical fluid, in at least an amount which when added to (i), (ii), and (iii), is sufficient to render the viscosity of said mixture to a point suitable for spray application;

(b) spraying said mixture onto a substrate to form the adhesive coating thereon.

In both the precursor adhesive coating composition embodiment as well as in the process using such precursor adhesive composition to apply the same to a substrate in which water is present as an additional viscosity reducing diluent, what is generally also desirably present is a coupling solvent. Such coupling solvent enables the presence of a single phase in the water-containing composition such that the components of the composition, namely, the polymeric components, the water, and the organic solvent all are at least partially miscible with one another. If desired, all of the organic solvent in the composition may be a coupling solvent, if such solvent has the necessary solvency characteristics for the polymeric components being used. At the very least, the precursor composition contains polymeric component, water and such coupling solvent. The active solvent, as used herein, is an organic solvent in which said polymeric compound is at least partially soluble and which is also at least partially miscible with the supercritical fluid. The coupling solvent would be used in conjunction with the active solvent or, may actually be one and the same.

As used herein, it is understood that the phrase "precursor adhesive coating composition" is a composition which is primarily intended and particularly suitable for admixture with at least one supercritical fluid for subsequent liquid spraying onto a substrate to provide a liquid coating thereon which, when dried or cured, helps produce either a substantially uniform, continuous adhesive coating or, if desired, a discontinuous, random droplet pattern coating on the substrate, which in either pattern provides a desired and/or cured adhesive coating having desirably good bonding characteristics. However, if desired, this precursor adhesive coating composition may, of course, be utilized for an entirely different purpose although such use would not constitute the preferred objective of the present invention. Thus, the precursor adhesive coating compositions may be utilized, if desired, by simply adding a suitable solvent to the composition (other than a supercritical fluid) and then using such a diluted composition as an adhesive coating medium in any conventional manner. It is to be understood that the scope of the present invention is not narrowly limited to using the precursor adhesive coating composition only with supercritical fluid and then spraying the resulting admixture. The precursor coating composition of the present invention is believed to be unique regardless of the manner in which it is eventually used.

Also as used herein, it is understood that the phrases "admixed adhesive coating composition" or "admixed liquid mixture" are intended to mean a sprayable mixture of the precursor adhesive coating composition and at least one supercritical fluid.

Still further, as used herein, the phrase "liquid droplet" is meant to include a droplet containing at least a portion of the solids fraction and a portion of the solvent fraction and may also include entrained supercritical fluid and optionally water.

It should be understood that the above noted instances in which it would be desirable to utilize water as an additional viscosity reducing diluent are only exemplary. Other situations may arise, when using supercritical fluids as a viscosity reduction diluent, in which the use of water as yet an additional diluent would be applicable. Of course, the scope of the present invention includes such additional applications as well.

DETAILED DESCRIPTION OF THE INVENTION

Figure 1:
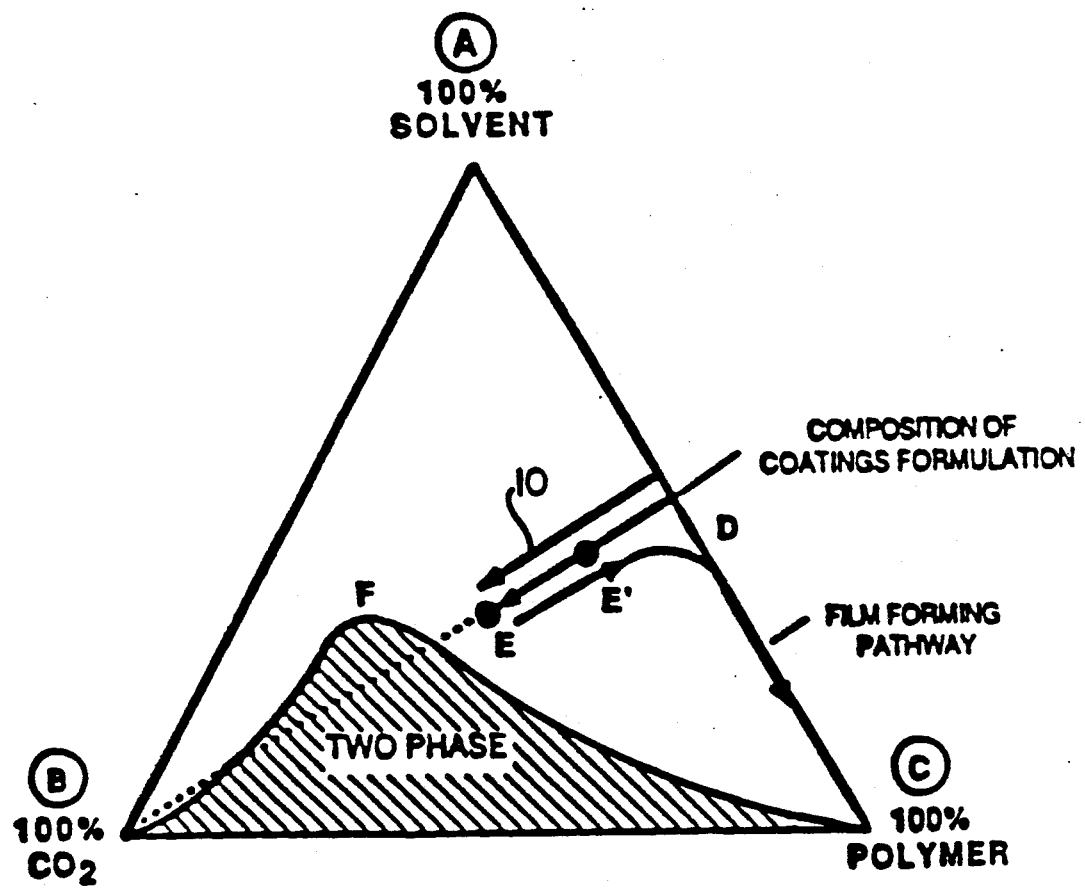
FIG. 1 is a phase diagram of supercritical carbon dioxide fluid spray coating.

Because of its importance to the claimed invention, a brief discussion of relevant supercritical fluid phenomena is warranted.

The supercritical fluid phenomenon is well documented, see pages F-62 - F-64 of the CRC Handbook of Chemistry and Physics, 67th Edition, 1986-1987, published by the CRC Press, Inc., Boca Raton, FL. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" is the transition point at which the liquid and gaseous states of a substance merge with each other and represent the combination of the critical temperature and critical pressure for a given substance.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

| EXAMPLES OF SUPERCRITICAL SOLVENTS | | | | |
|---|---|---|---|---|
| Compound | Boiling Point (°C.) | Critical Temperature (°C.) | Critical Pressure (atm) | Critical Density (g/cm³) |
| CO₂ | −78.5 | 31.3 | 72.9 | 0.448 |
| NH₃ | −33.35 | 132.4 | 112.5 | 0.235 |
| H₂O | 100.00 | 374.15 | 218.3 | 0.315 |
| N₂O | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability, and low critical temperature of carbon dioxide, supercritical carbon dioxide fluid is preferably used with the precursor adhesive coating compositions of the present invention. For many of the same reasons, nitrous oxide (N₂O) is a desirable supercritical fluid for admixture with the precursor adhesive coating compositions of the present invention. However, any of the aforementioned supercritical fluids and mixtures thereof are to be considered as being applicable for use with the precursor adhesive coating compositions.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

The precursor adhesive coating compositions of the present invention comprise a solids fraction containing at least one polymeric compound capable of forming an adhesive coating on a substrate and a solvent fraction containing at least one solvent in which the polymeric compound is at least partially soluble.

The polymeric compounds that are suitable for use in the present invention as adhesive coating materials generally include any of the polymers which are well known to those skilled in the adhesive coating art. There are preferred polymers, however, which are particularly desirable due to their possessing specific characteristics which make them generally more suitable for (1) admixture with a supercritical fluid followed by (2) spraying such admixture onto a substrate.

Generally, the polymers which may be used in the present invention must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, natural rubbers, styrene-isoprene-styrene block copolymers, polyisobutylene, thermoplastic rubbers, neoprene or polychloroprene rubbers, and the like. Also included are mixtures of the above adhesives coating materials commonly used and known to those skilled in the art that are formulated to achieve performance and cost balances required of commercial coatings.

Typically, it is desired that a substantially uniform, continuous adhesive coating layer is applied to the substrate. However, there may be occasion to desire an adhesive coating layer which is actually discontinuous remaining in the random droplet pattern as applied by the spray. Such a random, discontinuous droplet pattern may be desired when, for example, only a relatively small amount of adhesive is wanted in the adhesive coating layer so as to provide a temporary bonding. So too, such a pattern would be desired where it is expected that a considerable amount of pressure will be applied between the two adherends to be bonded which pressure will, in essence, form a uniform continuous adhesive layer but which will have no external oozing of such adhesive due to the relative lesser amount of adhesive originally present. In any event, regardless of the particular coating layer desired, there are particular characteristics possessed by both the polymer and the solvent used in the precursor adhesive coating composition which may have an affect upon obtaining the particularly desired pattern. As used herein, the phrase "adhesive coating" is meant to include a substantially uniform, continuous adhesive coating film as well as a substantially discontinuous, random droplet pattern arrangement as well.

One characteristic which is possessed by particularly preferred low molecular weight polymers are those having a high molecular weight fraction of the molecular weight distribution of the polymeric compound which is minimized. A discussion of polymer molecular weight can be found in, for example, "Rheological Measurement for Quality Control" by S. B. Driscoll, *Rubber World* (Dec., incorporated by reference. Polymers used as adhesives frequently have high elasticity, however, those having a minimized high molecular weight fraction of their molecular weight distribution, which minimizes chain entanglement, are preferred. Once sprayed, however, chain entanglement of the polymers may be desirable, particularly with adhesive compositions, so as to better form the desired adhesive coating. The escape of the supercritical fluid from the adhesive composition as it is being sprayed aids in the early formation of such chain entanglement.

A useful and conventional measure for determining the high molecular weight fraction of the molecular weight distribution is the ratio of the weight average (Mw) molecular weight of the polymeric compound to the number average (Mn) molecular weight of that polymeric compound, i.e., Mw/Mn. Reference is made to, for example, "Introduction to Polymers and Resins", Federation Series On Coatings Technology (1986), pages 26–31, which discusses molecular weight determination of polymers, the contents of which are incorporated herein by reference. Generally, for a given number average molecular weight, Mn, the higher the ratio of Mw/Mn, the greater the high molecular weight fraction that is present in the polymer and the greater the elastic component of viscosity possessed by such polymer.

Preferably, the predominant polymeric compound used in the precursor composition of the present invention has a Mw/Mn ratio of less than about 4, and preferably less than about 3, and most preferably less than about 2.

The higher the elastic component of viscosity possessed by the polymer, the more difficult it is to atomize an admixed precursor adhesive coating composition containing supercritical fluid made from such a polymer. Generally, as an admixed coating composition is released through the spray orifice, shearing forces act upon the material causing it to tear itself apart into fine atomized droplets. When, however, the polymer has a high elastic component of viscosity, such tearing apart is hindered and the composition does not atomize as well. Such a low modulus of elasticity is also particularly desired when a substantially uniform, continuous adhesive coating layer is desired. If, however, a random discontinuous droplet pattern layer is desired, a slightly high modulus of elasticity is beneficial.

Particularly desirable polymers having a relatively low elastic component of viscosity include those set forth in Table 2 below.

TABLE 2

| Polymer | $M_n$ | $M_w$ | $M_w/M_n$ |
|---|---|---|---|
| Alkyd resins | 25,000–50,000 | 50,000–200,000 | 2–4 |
| Epoxy resins | 350–4,000 | 350–7,000 | 1.0–2.5 |
| Acrylic, thermoplastic, solution polymer | 25,000–350,000 | 40,000–600,000 | 1.5–3 |
| Acrylic, thermoplastic, emulsion polymer | 500,000–2,000,000 | 650,000–2,500,000 | 1.1–1.8 |
| Acrylic thermosetting, oligomer | 1,000–2,000 | 1,200–2,200 | 1.1–1.5 |

TABLE 2-continued

| Polymer | $M_n$ | $M_w$ | $M_w/M_n$ |
|---|---|---|---|
| Polybutadiene, anionic polymerized | 2,000–5,000 | 2,100–5,200 | 1.05–1.1 |

The solvent fraction of the precursor composition of the present invention includes at least one active solvent in which the at least one polymer compound is at least partially soluble. While the solvents that are suitable for use in the present invention include any solvent or mixture o solvents which is capable of dissolving, dispersing or suspending the solids fraction when admixed with the supercritical fluid, as with the solids fraction discussed above, there are preferred solvent and solvent mixtures which are particularly desirable. Such preferred solvents possess certain desirable characteristics which make them generally more suitable for admixture with a supercritical fluid followed by spraying such admixture onto a substrate material.

Generally, it is quite apparent that the selection of a particular solvent or solvent mixture will be dependent upon the particular polymeric compounds being used.

Suitable solvents which may be utilized in the precursor adhesive coating compositions of the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propxy ethanol, butoxy 2-propanol and other glycol ethers; blycol ether esters such as butoxyethoxy acetate, ethyl 3-ethoxy propionate and other glycol ether esters; alcohols such methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

The selection of a particular solvent fraction for a particular polymeric adhesive for a given end use is well known to those skilled in the art and need not be elaborated upon here. Reference is made to, for example, *Treatise On Adhesion and Adhesives*, edited by Patric, R.L., (Marcel Dekker, Inc. NY, 1969) which is incorporated herein by reference, in which the various types of adhesives and their corresponding solvents and end uses are discussed.

In general, solvents suitable for the present invention should have the desired solvency characteristics as aforementioned and also the proper balance of evaporation rates so as to ensure desirable coating formation. In other words, the solvent fraction should have a proper blend of fast and slow solvents.

More specifically, solvents having fast evaporation rates are needed to help solubilize the solids fraction, as well as help reduce viscosity, and to substantially leave the admixed coating composition once it has been sprayed and before the atomized droplets contact the substrate. Correspondingly, solvents having slow evaporation rates are also needed to help solubilize the solids fraction, but these solvents are primarily needed to be present on the substrate after the atomized droplets have been applied so as to provide enough flow-out to produce a uniform and continuous coating where such a coating is desired. If a random, discontinuous droplet pattern is desired instead, less of the slow solvent is preferred.

However, too much of the fast solvent will produce a dry coating not having enough flow-out. Conversely, too much of the slow solvent will produce a coating having sagging and running defects and will not readily be dried thereby hindering the early handling of such a coated substrate.

Based on a relative evaporation rate (RER) to a butyl acetate standard equal to 100 using ASTM Method D3599 at 25° C. and one atmosphere pressure, the solvent fraction desirably has the following composition of fast and slow solvents as represented by corresponding RER values:

| Wt. % of Total Solvent Fraction | RER |
|---|---|
| 30–100% | <50 |
| 0–70% | 50–100 |
| 0–40% | 101–250 |
| <10% | >250 |

More preferably, the solvent fraction has the following composition:

| Wt. % of Total Solvent Fraction | RER |
|---|---|
| 40–100% | <50 |
| 0–60% | 50–100 |
| 0–30% | 101–250 |
| <5% | >250 |

Another characteristic of the solvent fraction which desirably is optimized so as to make it particularly suitable for admixture with a supercritical fluid with subsequent spraying thereof is the surface tension of the solvent fraction. Specifically, the less surface tension that a solvent has, the more desirable it is.

Accordingly, solvent having low surface tension provide good atomization of the admixed precursor coating composition providing a fine aerosol. Such a fine aerosol desirably facilitates the escape of the supercritical fluid form the sprayed admixed coating composition prior to its contacting the substrate.

Moreover, solvents having low surface tension also facilitate the formation of good coatings on the substrate by aiding in the diffusion of any residual supercritical fluid that may still be entrapped within the applied coating. So too, low surface tension solvents also help to suppress the formation of any bubbles caused by such residual supercritical fluid as it escapes. Still further, solvents having low surface tension desirably provide fast wetting and spreading characteristics which also aid in the formation of a defect-free, uniform, substantially continuous coating on the substrate where such is desired. If a random, discontinuous droplet pattern is desired, a slightly higher surface tension is desired.

Preferably, the solvent fraction has a surface tension at 25° C. which is desirably less than 35 dynes/centimeter. More preferably, the surface tension is less than 30 dynes/centimeter, for example, 23 –28 dynes/centimeter.

It is understood that it is not necessary that the solvent or solvent mixture possess such surface tension characteristics per se. While such solvents do certainly exist, as exemplified by such solvents as toluene, VM&P naphtha, butyl acetate, pentyl propionate, glycol ethers, methyl PROPASOL® acetate (manufactured by Union Carbide Corp., Danbury, CT), UCAR® Ester EEP (manufactured by Union Carbide Corp., Danbury, CT), and the like, there are conventional additives which may be added to the precursor composition which contains the solvent and solids fractions so as to suppress the surface tension of the composition as a whole, such additives include surface active materials, commonly known as surfactants, which are well known to those skilled in the art and which are applicable to be used in both the solvent fraction of the present invention as well as in the precursor coating composition as a whole.

Still further in connection with the solvent fraction, as the admixed coating composition containing the mixture of polymer, solvent and supercritical fluid is sprayed, the evaporation of the fast solvent contributes to the overall cooling of the sprayed composition. Inasmuch as the solubility of most supercritical fluids, particularly carbon dioxide, is higher at cooler temperatures, such cooling manifestly hinders the diffusion of the supercritical fluid from the sprayed composition. It is desirable to have essentially all of the supercritical fluid escape from the admixed coating composition, once it has been sprayed, such that essentially none of the supercritical fluid is left once the atomized liquid droplets contact the substrate.

In order to help minimize the cooling effect caused by evaporation of the fast solvent, it is desirable that the solvent fraction have an overall low heat of vaporization. Preferably, the solvent fraction has an overall heat of vaporization of less than 110 calories per gram of solvent fraction and more preferably, less than about 100 calories per gram of solvent fraction. Desirably, the overall heat of vaporization of the solvent fraction is in the range of from about 65 to 95 calories/gram.

Keeping in mind the underlying primary objective of the present invention, namely, to minimize the unnecessary release of solvent vapors into the atmosphere during the spray application of the admixed adhesive coating compositions, it is clear that the amount of solvent used in the precursor coating compositions should be less than that required to produce a mixture of polymeric compounds and solvent having a viscosity which would permit its application by liquid spray techniques. In other words, the inclusion of the solvent fraction should be minimized such that the diluent effect due to the presence of the supercritical fluid diluent is fully utilized.

However, reducing the amount of solvent in the coating composition is beneficial not only for the purpose of minimizing environmental pollution, but as recognized by the present invention, such reduction in the amount of solvent is also desirable to help facilitate the spraying of the coating composition once it has been admixed with supercritical fluid as well as improving the adhesive coating that is ultimately formed on the substrate.

Thus, as discussed earlier, one of the problems currently encountered in adhesive coating compositions which have been sprayed onto a substrate is the undesirable entrapment of an excessive amount of solvent which affects either subsequent curing and/or drying. This generally results in a reduction in the ultimate cohesive strength of the resulting adhesive or, at the very least, results in a lower production rate.

Furthermore, an excessive solvent fraction in the precursor coating composition diminishes the effectiveness of the supercritical fluid, because atomization is intensified such that deposition of the liquid spray onto the substrate becomes poorer than when the solvent fraction is not excessive. That is, the transfer of liquid coating to the substrate becomes less efficient. Therefore, more spraying must be done to build up coating thickness, with the result that more solvent is released to the environment and more precursor coating composition is used, which increases cost. In addition, because more spray passes must be used to build the desired coating thickness, a higher proportion of slow solvent is lost from the coating during the application process, so that less slow solvent is available to aid reflow of the coating to give a smooth surface once the desired coating thickness has been achieved. Without wishing to be bound by theory, it is believed that viscosity reduction caused by the excessive solvent fraction combines with viscosity reduction caused by the supercritical fluid to give droplets that have insufficient mass to be deposited efficiently onto the substrate from the spray. Instead, the droplets follow the gas flow into the environment. Using less solvent allows full utilization of the viscosity reduction of the supercritical fluid and gives droplet sizes that deposit efficiently onto the substrate.

Moreover, an excessive solvent fraction produces a greater wet coating thickness for a desired dry coating thickness and a lower coating viscosity on the substrate, which increases the tendency for the coating to sag or run during application, drying, and curing. In addition, as the excessive solvent evaporates from the coating, the coating shrinks to a greater degree during the drying process and flow currents can be induced inside the coating which disrupt the leveling to give a smooth surface. Drying time is also increased.

Consequently, in accordance with the present invention, the amount of solvent fraction that is present in the liquid mixture comprised of a solids fraction and a solvent fraction is no greater than about 650 grams of solvent per liter of liquid mixture. More preferably, the amount of solvent fraction contained in the liquid mixture is less than about 450 grams of solvent per liter of liquid mixture. Most preferably, the amount of solvent fraction is in the range of from about 200 to about 400 grams of solvent per liter of mixture.

The liquid precursor coating composition of the present invention comprising the solids fraction and the solvent fraction should have a viscosity of less than about 6,000 centipoise, preferably less than about 3,000 centipoise, and most preferably in the range of from about 500 to about 2,000 centipoise. Obviously, a major factor contributing to the viscosity of the liquid mixture is the amount of solvent fraction contained therein, which variable was discussed above. Hence, it is apparent that the amount of solvent fraction present in the precursor coating composition should be considered hand-in-hand with the desired viscosity that is to be obtained.

The viscosity of the precursor coating composition should be low enough such that there is enough solvent present to provide proper coalescence upon the substrate once the composition is sprayed if a uniform, substantially continuous adhesive film coating is desired while still being high enough to allow for a reduction in solvent usage so as to maximize the utilization of the supercritical fluid diluent and to concomitantly facilitate good atomization.

The viscosity of the precursor coating composition should also be such that when supercritical fluid is added, it is possible to add enough of the supercritical fluid, without entering the two phase region, such that the viscosity is lowered to less than about 300 centipoise, above the critical temperature and pressure of the supercritical fluid, so as to render the mixture suitable for spray application. More preferably, the admixed liquid adhesive coating composition has a viscosity which is less than about 150 centipoise and preferably has a viscosity in the range of from about 5 to 150 centipoise. Most preferably, the viscosity of the admixture of solids fraction, solvent fraction and supercritical fluid is in the range of from about 10 to about 50 centipoise.

Yet another factor which the precursor adhesive coating composition must address is the solubility of the supercritical fluid both at supercritical conditions and at the conditions of the substrate, i.e., after the composition has been sprayed.

The solubility requirements for these two sets of conditions are totally antithetical to one another. Thus, when admixing the supercritical fluid with the liquid precursor adhesive composition, it is desirable to have a composition which has a high solubility for the supercritical fluid at the supercritical conditions. In contrast, once the composition has been sprayed through the orifice, it is desirable that the solubility for the supercritical fluid at the conditions present in the environment of the substrate be as low as possible.

More particularly, in accordance with the present invention, the liquid precursor adhesive coating composition should have a solubility for the supercritical fluid, above the critical temperature and pressure of the supercritical fluid, of at least 5% by weight of the supercritical fluid in the liquid mixture. Preferably, the solubility should be at least 15% by weight of the supercritical fluid in the mixture, and more preferably about 20% to 50% or greater by weight of supercritical fluid in the mixture. Most preferably, it is in the range of from about 25% to about 35% by weight.

If the precursor adhesive coating composition has a solubility which is less than that noted above, there simply would not be enough of a diluent effect provided by the supercritical fluid. This would result in an insufficient viscosity reduction such that the composition could not properly be sprayed.

Once the composition is admixed with supercritical fluid and sprayed, it is desirable to have the supercritical fluid diffuse through the sprayed composition as quickly as possible such that there is very little residual supercritical fluid left in the coating once it has come into contact with the substrate. Accordingly, the fluid, which of course is no longer supercritical, should have a solubility in the liquid precursor coating composition of less than about 0.8% by weight of the fluid in the non-supercritical state in the precursor coating composition. Preferably, the solubility of the fluid is less than about 0.6% by weight in the composition. Most preferably, the fluid should be soluble in the precursor coating composition in an amount of less than about 0.4%. As used herein, it is to be understood that the solubility of the fluid in the non-supercritical state is measured at 25° C. and in one atmosphere absolute pressure of the fluid.

In an alternative embodiment of the present invention, in order to further reduce the viscosity of an adhesive coating composition or, alternatively, reduce even further the amount of volatile solvents that are present in the composition, water may be added as yet an additional viscosity reducing diluent. The addition of such water is particularly advantageous to those compositions which would not readily lend themselves to being suitable for spray application when admixed with supercritical fluids.

More particularly, to better understand the phenomenon that is occurring when a supercritical fluid, such as supercritical carbon dioxide, is added to a precursor adhesive coating composition and the problems that may be encountered, reference is made to the phase diagram in FIG. 1 wherein the supercritical fluid is supercritical carbon dioxide fluid. In FIG. 1, the vertices of the triangular diagram represent the pure components of an admixed coating composition which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating composition in which supercritical carbon dioxide has not been added. The point E represents a possible composition of an admixed adhesive coating composition, after admixture with supercritical carbon dioxide. Generally, the addition of supercritical carbon dioxide reduces the viscosity of the viscous precursor coating composition to a range where it can be readily atomized through a liquid spray apparatus.

Thus, after atomization, a majority of the carbon dioxide vaporizes, leaving substantially the composition of the original viscous coating composition. Upon contacting the substrate, the remaining liquid mixture of the polymer and solvent(s) component(s) will flow, i.e., coalesce, to produce a substantially uniform, continuous adhesive film on the substrate. The film forming pathway is illustrated in FIG. 1 by the line segments EE'D (atomization and decompression) and DC (coalescence and film formation).

However, the addition of supercritical carbon dioxide to a viscous adhesive coating composition does not always result in a viscosity reduction which is sufficient to allow for spraying of the composition. Such viscosity reduction is limited to the amount of supercritical fluid, such as supercritical carbon dioxide, that can be admixed with the adhesive coating composition. If not enough supercritical fluid can be added, then the viscosity of the composition is not lowered enough to make it suitable for spray application. This limitation as to the amount of supercritical fluid that can be added to the composition is generally a function of the miscibility of the supercritical fluid with the adhesive coating composition and can best be visualized by again referring to FIG. 1.

As can be seen from the phase diagram, particularly as shown by arrow 10, as more and more supercritical carbon dioxide is added to the adhesive coating composition in an attempt to reduce its viscosity sufficiently, the composition of the admixed liquid coating mixture approaches the two-phase boundary represented by line BFC. If enough supercritical carbon dioxide is added, the two-phase region is reached and the composition correspondingly breaks down into two phases. Sometimes, it may be desirable to admix an amount of supercritical fluid (in this case, supercritical carbon dioxide) which is even beyond the two-phase boundary. Generally, however, it is not preferable to go much beyond this two-phase boundary for optimum spraying performance and/or coating formation. This two-phase region may be reached, however, prior to achieving the necessary viscosity reduction. Any additional supercritical carbon dioxide added to the system beyond this point will generally not aid in any further viscosity reduction.

Figure 2:
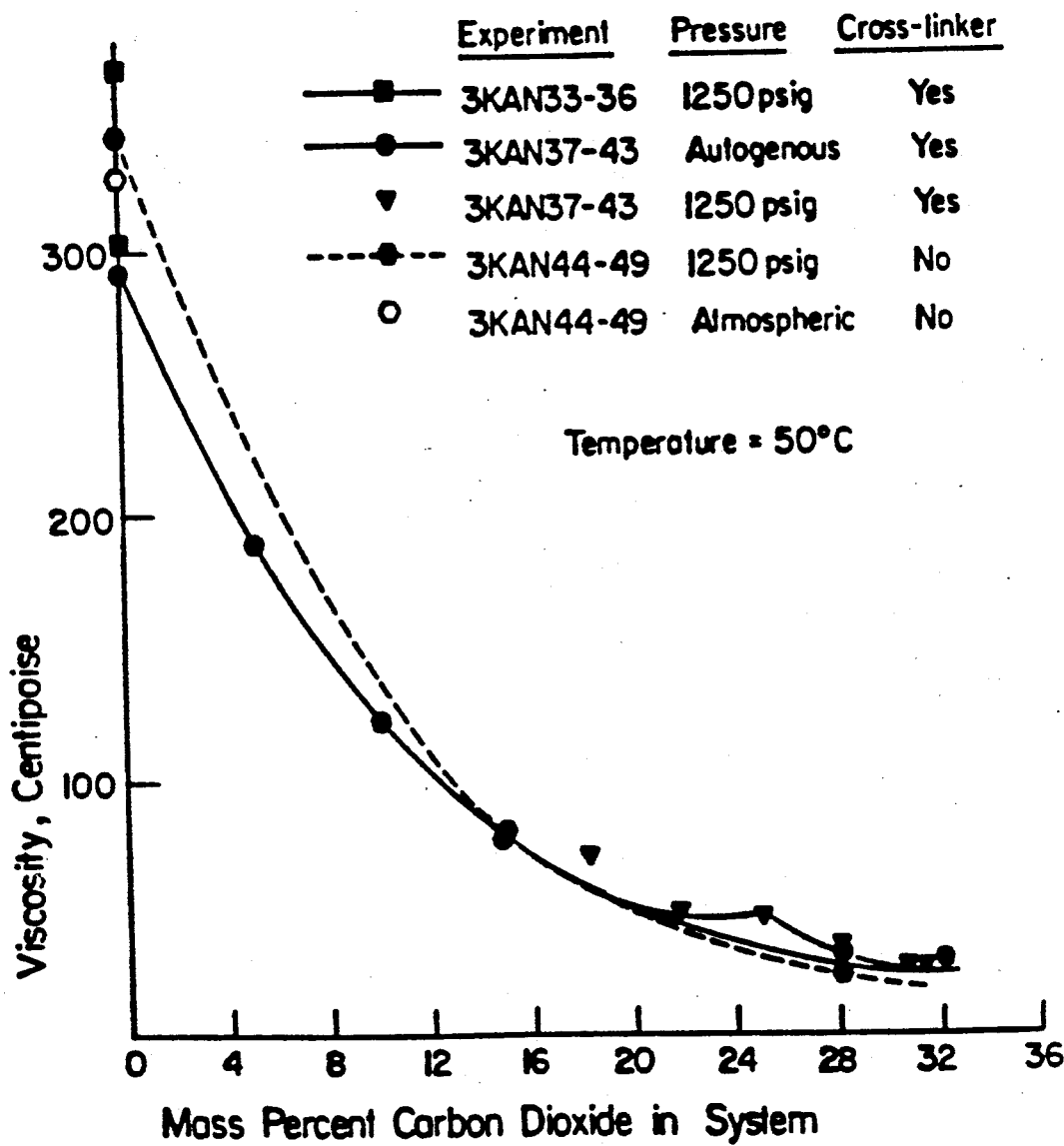
FIG. 2 is a graph illustrating the viscosity versus composition relationship for a 65% viscous polymer solution in methyl amyl ketone.

Viscosity reduction brought about by adding supercritical carbon dioxide fluid to viscous coating compositions is illustrated in FIG. 2. There, the viscous coating composition of 65 percent polymer solution in methyl amyl ketone, which corresponds to point D in FIG. 1 has a viscosity of about 300 centipoise and the solution is unsprayable. Adding supercritical carbon dioxide fluid to the coating composition reduces the viscosity such that a liquid mixture that contains 28 percent supercritical carbon dioxide fluid, which corresponds to point E in FIG. 1, is formed. This liquid mixture now has a viscosity of less than 30 centipoise and readily forms a liquid spray by passing it through an orifice in an airless spray gun. The pressure utilized in FIG. 2 is 1250 psi at a temperature of 50° C. The polymer is Acryloid TM AT-400, a product of Rohm and Haas, which contains 75 percent of non- volatile acrylic polymer dissolved in 25 percent methyl amyl ketone.

In accordance with the present invention, however, water may be added to a highly viscous adhesive coating composition as a further viscosity reducing diluent, which water-containing composition may then be admixed with supercritical fluids. Regardless of how the coating composition has come to have an unusually high viscosity, whether it be due to the nature of the polymer itself (e.g., its molecular weight) or the nature and/or amount of the solvent present in the composition, the addition of the water will generally aid in reducing the viscosity to the extent such that when admixed with the supercritical fluids, the resulting admixed composition containing such water and supercritical fluids will be suitable for spraying.

Generally, the amount of water that is present in the composition is up to about 30 percent by weight based on the weight of the total solvent fraction contained in the composition. Preferably, the amount of water is less than about 20 percent by weight on that same basis.

Higher quantities of water than those noted above may be not be desirable for a number of reasons. For one, too much water may also result in a phase separation, i.e., the composition breaks down into a water phase and an organic solvent phase. Such a phase separation, as in the case of a phase separation caused by an excessive amount of supercritical fluid, may result in poor spraying performance and/or poor coating formation.

Thus, without wishing to be bound by theory, once such a phase separation takes place, the separate water phase may attract supercritical fluid and organic solvent leaving less organic solvent present in the separate organic solvent phase. This may result in a viscosity imbalance between the two phases which may very well hinder or prevent the spray application of the coating composition.

So too, it is also believed, again without wishing to be bound by theory, that the concentration of the organic solvent in the water phase may be such that even if the composition were sprayed, there may be an excessive evaporation of such solvent resulting in an insufficient amount of solvent on the substrate to allow for proper coalescence of the atomized particles resulting in a coating which may not be substantially continuous.

For similar reasons, in the case where water is added to a coating composition so as to replace a portion of the organic solvent present therein and thereby further reduce the overall organic solvent content, there should still be enough solvent present which will facilitate the proper flow out and coalescence of the sprayed particles on the substrate when it is desired to form a substantially uniform and continuous adhesive coating thereon.

Accordingly, it is generally desirable to add as much water as may be necessary so as to provide a precursor adhesive coating composition whose viscosity may be reduced to a point suitable for spray application by subsequent admixture with supercritical fluids.

Although the above discussion has focused upon those cases in which the amount of supercritical fluid added to a viscous composition is ineffective to reduce the viscosity to the extent necessary in order to spray such composition and adding water to these compositions in accordance with the present invention so as to be able to spray them, it is understood that the addition of water to an adhesive coating composition is not limited to only those conditions. Indeed, water may be added to an adhesive coating composition for subsequent admixture with supercritical fluids even when the viscosity of the original composition is such that the addition of supercritical fluids is indeed capable of reducing the viscosity to a point suitable for spraying.

For example, in the case where it is desirable to simply reduce the amount of volatile solvent present in a first coating composition where such first coating composition could be sprayed when admixed with supercritical fluids, it is clear that when water is used to replace some of the volatile organic or non-aqueous solvent contained therein, there is no concern here as to phase separation caused by an excessive amount of supercritical fluid.

As briefly discussed earlier, even after water is added to an adhesive coating composition, it has been found by virtue of the present invention that the amount of supercritical fluid that is capable of being admixed with the now water-containing composition, in absolute terms, remains substantially the same. In other words, if, for example, 100 grams of supercritical carbon dioxide were able to be admixed with a particular composition, after adding water to this composition, approximately 100 grams of supercritical carbon dioxide can still be admixed with the now water-containing composition.

That is not to say, however, that it is necessary to add the same amount of carbon dioxide in the new water-containing composition as was capable of being added to the original composition. Although it is beneficial to maximize the amount of supercritical fluids that are utilized as diluents for viscosity reduction to thereby keep the solvent fraction, particularly the organic solvents and/or non-aqueous diluents , to a minimum, there is no criticality as to the amount of supercritical fluids that are used other than using an amount which will produce a sprayable composition.

However, the capability of the water-containing composition to be admixed with the same amount of supercritical fluids that was able to be used in the "dry" composition is significant inasmuch as the concomitant diluent effect that is obtained by the supercritical fluid can be expected to also remain substantially constant.

In addition to the water that is present in the precursor coating compositions of the present invention, which water is used as a further viscosity reducing diluent, it is generally also desirable to have a coupling solvent present in the precursor adhesive coating composition as well. Of course, if an adhesive coating composition to which the water is added already contains an organic solvent which may be characterized as a coupling solvent, no further addition of such a coupling solvent need be made. Similarly, if a precursor adhesive composition is being initially prepared with water, at least one of the organic solvents used for such composition should desirably be a coupling solvent.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may be optimally sprayed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers, propylene glycol ethers, chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

When using both a coupling solvent as well as an active solvent in the precursor coating compositions of the present invention, the ratio of coupling solvent to active solvent is generally in the range of from about 1:1 to 4:1, preferably about 2:1 to 3.5:1, and most preferably about 2.5:1 to 3:1. Generally, the ratio of coupling solvent to active solvent will be dependent, among other things, on the hydrophobicity of the active solvent.

The precursor adhesive coating compositions of the present invention may contain any of the various additives that are conventionally used in the adhesive coating art. For example, curing agents, fillers, plasticizers, surfactants, bacteriocides, tackifiers, vulcanizing agents, oxidation inhibitors, pigments, chelating agents, and the like, may all be present in the composition. The selection and use of such conventional additives are well know to those skilled in the art.

A still further characteristic which the precursor coating composition should desirably possess is a high diffusivity for passing the supercritical fluid out of the composition once it has been sprayed with such supercritical fluid into the environment of the substrate. Such high diffusivities are desirable to help the supercritical fluid quickly escape from the sprayed liquid mixture. This helps prevent the presence of any residual supercritical fluid in the liquid coating applied to the substrate and thereby helps ensure the formation of a uniform, defect-free coating.

Accordingly, the precursor coating composition should desirably possess an apparent gas diffusion rate (based on a sprayed particle average velocity of about 2 to about 8 m/sec and a spraying distance of about 30 cm at 25° C. and one atmosphere pressure) from the time it has been sprayed with supercritical fluid to the time it impacts on the substrate of at least about 7 to about 26 grams of supercritical fluid per gram of precursor coating composition per second.

The precursor adhesive coating composition, after having been admixed with supercritical fluid, is sprayed onto a substrate to form a liquid coating thereon containing solids fraction, a portion of the solvent fraction, a portion of the water, if applicable, and any residual supercritical fluid that may be left by passing the admixed liquid mixture under pressure through an orifice into the environment of the substrate to form a liquid spray.

An orifice is a hole or an opening in a wall or housing, such as in a spray tip of a spray nozzle on an electrostatic spray gun, through which the admixed liquid adhesive coating composition flows in going from a region of higher pressure, such as inside the spray gun, into a region of lower pressure, such as the air environment, outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as adhesive paints, lacquers, enamels, and varnishes, are suitable for spraying the precursor adhesive coating compositions of the present invention when admixed with supercritical fluids. Spray guns, nozzles, and tips are preferred that do not have excessive flow volume between the orifice and the valve that turns the spray on and off. The spray guns, nozzles, and tips must be built to contain the spray pressure used.

There are a broad variety of spray devices that one may use in spraying the precursor adhesive coating composition of the present invention after it has been admixed with supercritical fluid. Essentially, any spray gun may be used, from conventional airless and air-assisted airless spray devices to electrostatic spray devices. The choice of spray device is dependent upon the kind of application that is contemplated.

The material of construction of the orifice through which the admixed coating composition is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the admixed liquid mixture should generally range from about 0.004- inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore, small orifice sizes from about 0.004-inch to about 0.025-inch diameter are preferred. Orifice sizes from about 0.007-inch to about 0.015-inch diameter are most preferred for obtaining a droplet pattern.

The designs of the spray tip that contains the spray orifice and of the spray nozzle that contains the spray tip are not critical. The spray tips and spray nozzles should have no protuberances near the orifice that would interfere with the spray.

The shape of the spray is also not critical to being able to spray the admixed coating composition. The spray may be in the shape of a cone that is circular or elliptical in cross section or the spray may be in the shape of a flat fan, but the spray is not limited to these shapes. Sprays that are flat fans or cones that are elliptical in cross section are preferred. Wide-angle fans are most preferred for obtaining a droplet pattern.

The distance from the orifice to the substrate is generally at a distance of from about 4 inches to about 24 inches. A distance of 6 inches to 18 inches is preferred. A distance of 8 inches to 14 inches is most preferred. The greater distances are preferred for obtaining a droplet pattern.

The atomized liquid spray is applied to the substrate by traversing the orifice past the stationary substrate, by traversing the substrate past the stationary orifice, or a combination of both. The relative linear velocity between the spray orifice and the substrate will generally determine the coating pattern that is applied to the substrate. Thus, if the relative traversal speed between the spray orifice and the substrate is relatively slow, generally, a uniform, substantially continuous adhesive film layer is produced. This is caused by, among other things, there being a sufficient amount of liquid droplets being applied to the substrate so as to cause proper coalescence and flow-out and provide such a continuous film layer. Generally, the traversal speed is a function of spray distance to the substrate, spray angle, solids concentration of composition, nozzle orifice size, and the like. Typically, in order to obtain such a continuous adhesive film layer, the relative traversal speed between the spray orifice and the substrate should be less than about 1 meter/second at a spray distance of 12 inches, fan width of greater than 12 inches and an orifice size of less than 0.011 inch. Accordingly, as used herein, it will be understood that a traversal speed will be given based on these fixed conditions.

On the other hand, however, where it is desired to have a random, substantially discontinuous droplet pattern present on the substrate, the relative traversal speed is much faster. In this manner, a relatively smaller amount of liquid spray is applied to the substrate thereby preventing the coalescence of these liquid droplets resulting in the formation of the discontinuous droplet pattern layer on the substrate. Typically, the relative traversal rate for obtaining such a random, discontinuous droplet pattern adhesive layer on the substrate is greater than about 1 meter/second.

Devices and flow designs that promote turbulent or agitated flow in the liquid mixture prior to passing the liquid mixture under pressure through the orifice may also be used. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is often desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of precursor adhesive coating composition that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate, which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the spray is charged negative relative to electrical ground.

The method of charging the spray is not critical to the practice of the invention provided the charging method is effective. The precursor adhesive coating composition can be electrically charged by applying high electrical voltage relative to the substrate and electrical current (1) within the spray gun, by direct contact with electrified walls or internal electrodes before leaving the orifice; (2) after the spray emerges from the orifice, by electrical discharge from external electrodes located near the orifice and close to the spray; or (3) away from the orifice, by passing the spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the admixed adhesive liquid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the admixed adhesive liquid mixture as it flows through the gun. This internal charging method has the advantage of having no external electrode that could interfere with the spray. A disadvantage is that if the admixed adhesive liquid mixture is not sufficiently electrically insulating, electrical current leakage can occur through the admixed adhesive liquid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the spray is electrically charged after it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation in between such that the electrical current issuing from the sharp point is favorably directed to the spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the admixed adhesive liquid mixture than charging method (1). Admixed adhesive liquid mixtures that are sufficiently conductive must have the feed supply and feed line insulated from electrical ground. In charging method (3) above, the spray is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The spray is passed through or between electrified grids or arrays of external electrodes before the spray is deposited onto the substrate. The spray droplets are charged by ion bombardment from the electrical current discharged into air from the electrodes. The electrified grid may be one or several wires electrodes that extend across the spray area. Current can discharge from along the length of the electrodes. The electrified array may be one or several wire or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. Conventional high voltage electrical power supplies can be used. The power supply should have standard safety features that prevent current or voltage surges. The electrical power supply may be built into the spray gun. Other charging methods may also be used.

The spray pressure used is a function of the precursor adhesive coating composition, the supercritical fluid being used, and the viscosity of the liquid mixture. The minimum spray pressure is at or slightly below the critical pressure of the supercritical fluid. Generally, the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the precursor adhesive coating composition, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally, liquid mixtures with greater amounts of supercritical carbon dioxide fluid require higher spray temperatures to counteract the greater cooling effect.

If supercritical carbon dioxide fluid is employed as the supercritical fluid diluent, it preferably should be present in amounts ranging from about 10 to about 60 weight percent based upon the total weight of the admixed coating composition containing the solids fraction, the solvent fraction, water and supercritical carbon dioxide, thereby producing a mixture having viscosities from about 5 centipoise to about 150 centipoise at spray temperature. Most preferably, it is present in amounts ranging from about 20 to about 60 weight percent on the same basis, thereby producing a mixture having viscosities from about 10 centipoise to about 50 centipoise at spray temperature.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment into which the admixed coating composition is sprayed is not critical. However, the pressure therein must be less than that required to maintain the supercritical fluid component of the liquid spray mixture in the supercritical state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate.

The process of the present invention may be used to apply adhesive coatings by the application of liquid spray to a variety of substrates. Examples of suitable substrates include but are not limited to metal, wood, glass, plastic, paper, cloth, ceramic, leather, masonry, stone, rubber, and composite materials.

Through the practice of the present invention, adhesive layers may be applied to substrates such that the dried and/or cured layers (whether uniform and substantially continuous or random and substantially discontinuous) have thicknesses of from about 0.2 to about 6.0 mils. Preferably, the layers have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. The assist gas may be heated to counteract the rapid cooling effect of the supercritical fluid diluent in the spray. The preferred temperature of heated assist gas ranges from about 35 to about 90 centigrade. The most preferred temperature ranges from about 45 to about 75 centigrade.

The precursor coating composition of the present invention may be admixed with a supercritical fluid and then sprayed onto a substrate by a spray apparatus such as that shown in either FIGS. 3 or 4.

The following illustrates apparatus that may be used to obtain the admixed adhesive coating composition of precursor adhesive coating composition and supercritical fluid and spray it in a batch mode in the practice of the present invention. The supercritical fluid illustrated is supercritical carbon dioxide fluid.

Table 3 contains a listing of the equipment used in conducting the procedure described for the batch mode.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal TM pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |

TABLE 3-continued

| Item # | Description |
|---|---|
| 8. | Zenith single-stream gear pump, model #HLB-5592-30CC, modified by adding a thin Grafoil TM gasket to improve metal-to-metal seal. |
| 9. | Zenith gear pump drive model #4204157, with 15:1 gear ratio, and pump speed controller #QM-371726F-15-XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite TM 37 polished 24-gauge steel panel, 6-inch by 12-inch size. |
| 16. | Vent valve. |
| 17. | Liquid feed valve. |
| 18. | Jerguson high-pressure sight glass series T-30 with window size #6 rated for 2260 psig pressure at 200 F. temperature. |
| 19. | Grove back-pressure regulator #5-90-W, rated for 2000 psig at 200 F. temperature; dome is charged with pressurized nitrogen to desired spray pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer #1602-811-00 with temperature controller and electronic timer. |
| 25. | Pyncnometer, double-valved one-quarter-inch high-pressure tubing. |

Figure 3:
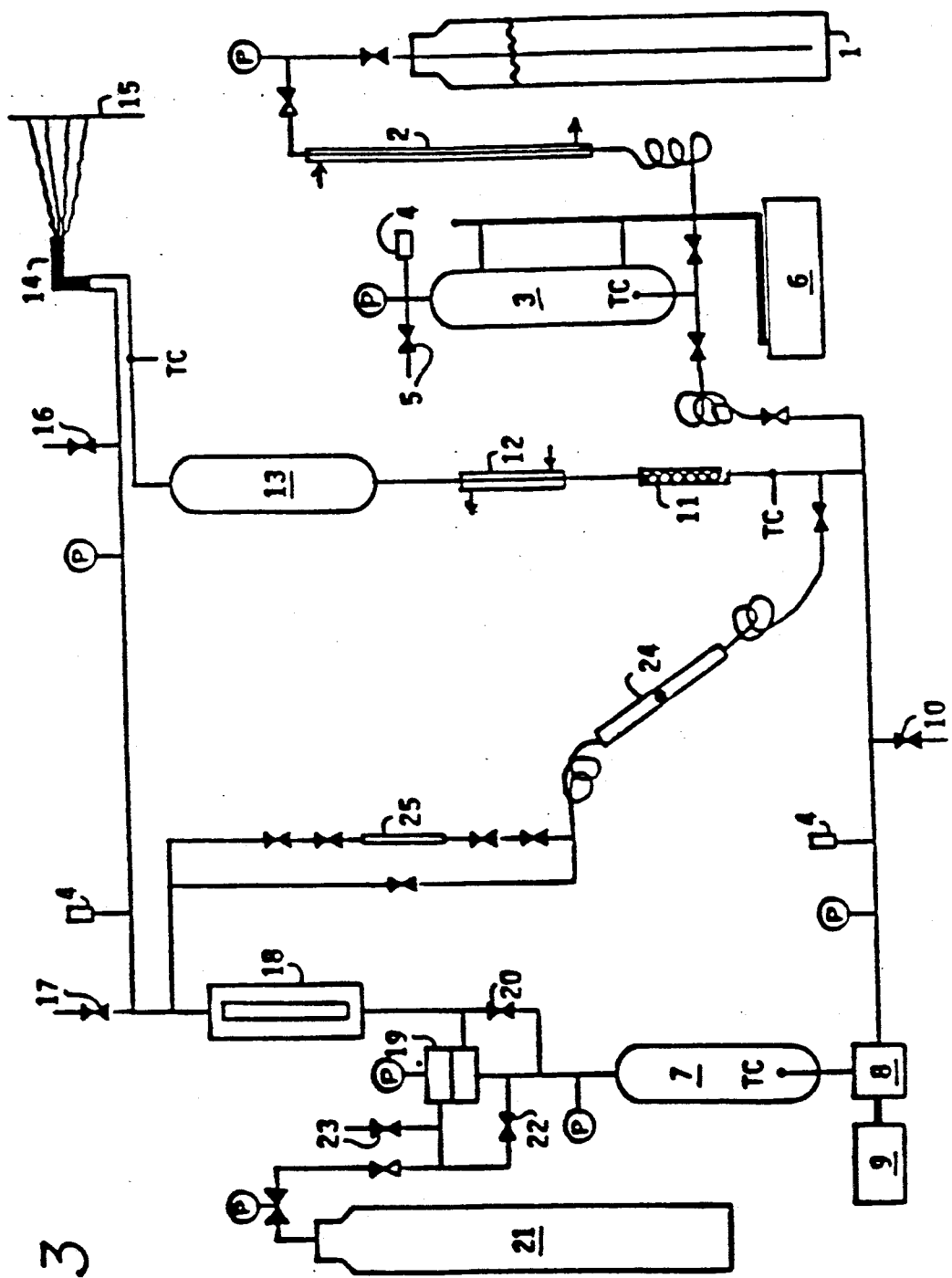
FIG. 3 is a schematic diagram of a spray apparatus that can be used with the adhesive coating composition of the present invention.

The apparatus listed in Table 3 above is assembled as shown in the schematic representation contained in FIG. 3. Rigid connections are made with ⅛-inch diameter high-pressure tubing for gas flows and with ¼-inch diameter high-pressure tubing for liquid flows, using Swagelok TM fittings. The spray gun is connected to the tubing by using two Graco flexible ¼-inch static-free nylon high-pressure hoses model #061-214 with 5000-psi pressure rating. Check valves are used to prevent back flow to the carbon dioxide feed tank (3) and bulk supply tank (1) and to the nitrogen cylinder (21). The circulation loop and carbon dioxide feed tank are protected from overpressurization by pressure relief valves (4).

The apparatus consists of a circulation loop, a carbon dioxide feed system, and a side loop to measure viscosity and density. The circulation loop contains a pump supply tank (7), a gear pump (8) to provide circulation and maintain constant spray pressure, a static mixer (11), a cooler (12) to remove excess heat, a spray supply tank (13), an airless spray gun (14), a sight glass (18), and a pressure regulator (19) to maintain constant spray pressure. The pressure regulator (19) is set by using compressed nitrogen (21) regulated to the desired flow pressure. The carbon dioxide feed system contains a carbon dioxide bulk supply cylinder (1), a refrigeration heat exchanger (2), and a carbon dioxide feed tank (3) mounted on an electronic scale (6). The feed and exit lines to the feed tank (3) are coiled so that the force of the tank moving on the scale does not affect the scale reading. The side loop contains a viscometer (24) and pyncnometer (25) for measuring the viscosity and density of the admixed adhesive coating composition, if desired.

All flow lines and tanks are lined with electrical heat tape and covered with insulation to heat the solution to spray temperature. The heat tape is divided into several circuits that are controlled independently:

Circuit #1 pressure regulator (19), bypass line (20), sight glass (18), and connecting lines.
Circuit #2 pump supply tank (7), gear pump (8), and line in circulation loop to carbon dioxide feed point.
Circuit #3 Line in circulation loop from carbon dioxide feed point to cooler (12).
Circuit #4 Spray supply tank (13).
Circuit #5 Line from spray supply tank (13) to flexible hose connected to spray gun (14).
Circuit #6 Carbon dioxide feed tank (3).

Thermocouples located within the tanks and lines measure temperature. Admixed adhesive coating composition temperature is kept uniform around the loop by rapid circulation and by adjusting the heat tapes.

The batch spray unit is filled by the following procedure. The unit is evacuated through the circulation loop vent (16) and a weighed amount of precursor adhesive coating composition is added through the feed valve (17) with the gear pump (8) circulating the material at a slow rate through the pressure regulator bypass valve (20). The carbon dioxide feed tank (3) is evacuated through the vent valve (5) and filled with liquid carbon dioxide from the carbon dioxide supply cylinder (1). To make filling the feed tank (3) easier, the carbon dioxide is passed through a refrigeration heat exchanger (2), so that the vapor pressure in the feed tank (3) is lower than the vapor pressure in the supply tank (1). The desired mass of carbon dioxide is pressurized into the circulation loop by heating the carbon dioxide feed tank (3) and valving in the desired amount as read on the balance (6).

The spray pressure is generated by filling the unit with precursor adhesive coating composition and carbon dioxide to the required overall density and then heating it to the spray temperature. Prior to spraying, the pressure regulator (19) is bypassed (20) and the loop is at a uniform pressure. To prepare for spraying, the bypass (20) is closed so that the flow goes through the pressure regulator (19), which is adjusted to the flow pressure. During spraying, the spray pressure is kept constant by the gear pump (8) and the pressure regulator (19). The gear pump (8) pumps solution into the spray supply tank (13) from the pump supply tank (7) at a high circulation rate. The pressure regulator (19) discharges excess solution back into the pump supply tank (7). The pump supply tank (7) loses inventory and pressure, but the spray supply tank (13) is kept full and at spray pressure.

The following illustrates apparatus that may be used to obtain the admixed adhesive coating composition of precursor adhesive coating composition and supercritical fluid and spray it in a continuous mode int he practice of the present invention. The supercritical fluid illustrated is supercritical carbon dioxide fluid.

Table 4 contains a listing of the equipment used in conducting the procedure described for the continuous mode.

TABLE 4

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, |

TABLE 4-continued

| Item # | Description |
|---|---|
| | made of 304 stainless steel, having double end connectors, 1800-psig pressure rating. |
| 4. | Circle Seal TM pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon TM packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon TM packings; coating concentrate pump. |
| 9. | Graco Variable Ratio Hydra-Cat TM Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon TM seal. |
| 23. | Graco check valve model #214-037 with Teflon TM seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure sight glass series T-30 with window size #6 rated for 2260 psig pressure at 200 F. temperature. |
| 30. | Airless spray gun. |
| 31. | Bonderite TM polished 24-gauge steel panel, 6-inch by 12-inch size. |
| 32. | Zenith single-stream gear pump, model #HLB-5592-30C, modified by adding a thin Grafoil TM gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal TM pressure relief valve P168-344-2000 set at 2000 psig. |
| 34. | Drain from circulation loop. |

Figure 4:
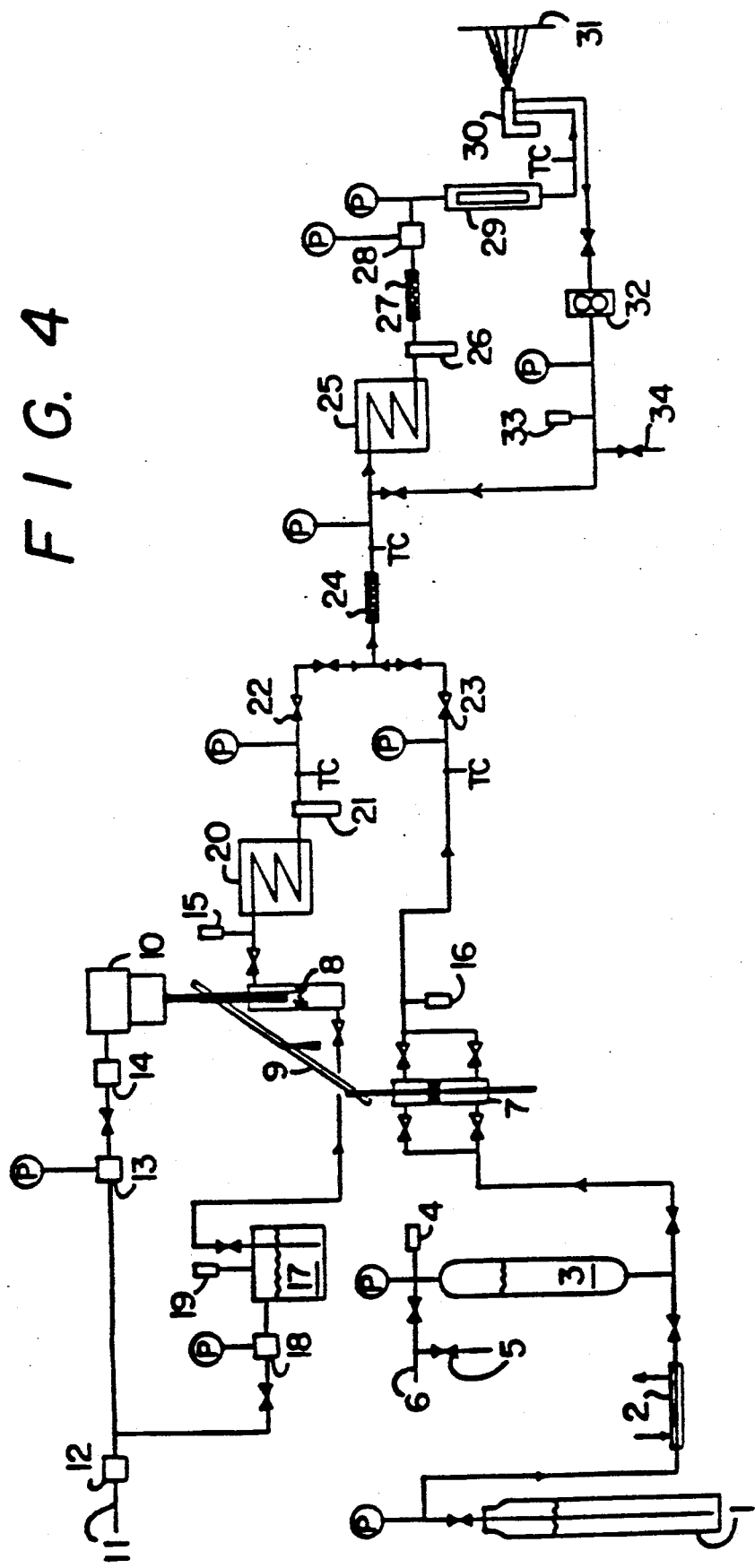
FIG. 4 is a schematic diagram of yet another spray apparatus that can be used with the adhesive coating composition of the present invention.

The apparatus listed in Table 4 above is assembled as shown in the schematic representation contained in FIG. 4. Rigid connections were made with Dukuron ¼-inch diameter 0.036-inch thick, seamless, welded, type 304 stainless steel hydraulic tubing ASTM A-269 with 5000-psi pressure rating, using Swagelok TM fittings. The pressure tank (17) is connected to the pump (8) using a Graco ⅜-inch static-free nylon high-pressure hose model #061-221 with 3000-psi pressure rating. All other flexible connections are made using Graco ¼-inch static-free nylon high-pressure hoses model #061-214 with 5000-psi pressure rating.

The precursor adhesive coating composition and carbon dioxide are pumped and proportioned by using a Graco Variable Ratio Hydra-Cat TM proportioning pump unit (9). It proportions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) is used to pump the precursor adhesive coating composition. It is of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The precursor adhesive coating composition is supplied to the primary pump (8) from a two-gallon pressure tank (17). After being pressurized in the pump to spray pressure, the precursor adhesive coating composition is then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) is used to pump the liquid carbon dioxide. A double-acting piston pump (7) with a four-check-valve design is used because of the high vapor pressure of carbon dioxide. The pump has an inlet and an outlet on each side of the piston; no flow occurs through the piston. The proportion of carbon dioxide pumped into the admixed adhesive coating composition is varied by moving the secondary pump (7) along the moving shaft. Bone-dry-grade liquid carbon dioxide is pumped from cylinder (1) through refrigeration heat exchanger (2) to secondary pump (7). For measuring the carbon dioxide uptake rate, the carbon dioxide is pumped from Hoke cylinder (3) through heat exchanger (2) to pump (7). The liquid carbon dioxide is refrigerated in heat exchanger (2) in order to lower the vapor pressure, to prevent cavitation in pump (7). The Hoke cylinder (3) is filled from cylinder (1). Air or gaseous carbon dioxide in the cylinder (3) is vented (5) during filling. The Hoke cylinder (3) is mounted on a 16-kilogram Sartorius electronic scale with 0.1-gram sensitivity so that the amount of carbon dioxide in it can be weighed. After being pressurized to spray pressure in pump (7), the liquid carbon dioxide is fed unheated through check valve (23) to the mix point with the precursor adhesive coating composition. After the precursor adhesive coating composition and carbon dioxide are proportioned together at the mix point, the admixed adhesive coating composition is mixed in static mixer (24) and pumped on demand into a circulation loop, which circulates the admixed adhesive coating composition at spray pressure and temperature to or through the spray gun (30). The admixed adhesive coating composition is heated in an electric heater (25) to obtain the desired spray temperature and filtered in a fluid filter (26) to remove particulates. Fluid pressure regulator (28) is installed to lower the spray pressure below the pump pressure, if desired, or to help maintain a constant spray pressure. A Jerguson sight glass (29) is used to examine the phase condition of the admixed adhesive coating composition. Circulation flow in the circulation loop is obtained through the use of gear pump (32).

The pressure tank (17) is filled with the precursor coating concentrate and pressurized with air to 50 psig. The primary pump (8) is primed by opening a drain valve on the bottom of filter (21) until air is purged from the line.

The carbon dioxide secondary pump (7) is positioned along the pivoting shaft to give the desired percentage of maximum piston displacement. The refrigeration flow is adjusted to a temperature of $-10°$ C. and circulated through the refrigeration heat exchanger (2) and the refrigeration tracing on pump (7). The carbon dioxide feed line and circulation loop are filled with carbon dioxide and vented through valve (34) several times to purge air from the system. Then the valves to the mixing point are closed and the carbon dioxide feed line is filled to prime pump (7).

The air pressure regulator (13) is adjusted to supply the air motor (10) with air at the desired pressure to pressurize the feed lines. The valves to the mix point are opened and the circulation loop filled with material. With the circulation loop return valve closed, to give plug flow around the circulation loop with no backmixing, material is drained from valve (34) until a uniform composition is obtained. Heater (20) is adjusted to give a feed temperature of 37° C. The circulation heater (25) is adjusted to give the spray temperature. The circulation loop return valve is opened and the spray mixture is circulated at a high rate by adjusting the gear pump (32). The carbon dioxide content of the admixed adhesive coating composition is measured by measuring the carbon dioxide uptake rate from Hoke cylinder (3) and the precursor adhesive coating composition uptake rate from pressure tank (17) while spraying through the spray gun. Then the carbon dioxide feed is switched back to supply cylinder (1).

An alternative method of proportioning the precursor adhesive coating composition and supercritical fluid in a continuous mode uses a mass proportionation apparatus instead of the volumetric proportionation apparatus illustrated above. The variable ratio proportioning pump unit (9) with pumps (7) and (8) shown in FIG. 4 is replaced with an apparatus having the following elements. For pumping the carbon dioxide, the double-acting four-ball piston pump (7) is driven individually on demand by attaching air motor (10) directly to it instead of being driven by the moving beam. Alternatively, the carbon dioxide can be pumped by using an air-driven cryogenic pump such as Haskel model DSF-35, which is a single-acting pump that utilizes a three-way cycling spool that is designed for pumping liquefied gases under pressure without requiring refrigeration to avoid cavitation. The pressurized carbon dioxide is then passed through a pressure regulator, which is used to control the desired spray pressure, and then through a mass-flow meter, such as Micro Motion model D6, which measures the flow rate of carbon dioxide as it is pumped on demand. For pumping the precursor adhesive coating composition, the standard double-acting primary piston pump (8) is replaced with a variable speed gear pump, such as the Zenith gear pump (32) that is used in the circulation loop. The gear pump pumping rate is controlled by a signal processor that receives the instantaneous carbon dioxide flow rate from the mass flow meter and then controls the gear pump revolution rate to pump the precursor adhesive coating composition at the proper flow rate to give the desired proportion of precursor adhesive coating composition and carbon dioxide in the admixed adhesive coating composition. An accumulator, such as Tobul model 4.7A30-4, may be installed in the circulation loop to increase the loop capacity and to minimize pressure pulsations in the loop when the spray gun is activated.

The methods of using adhesives to obtain a particular bond and the variations of the specific adhesive formulations for obtaining particular adhesive requirements are well known and conventional to those skilled in the art.

For example, when one or more of the surfaces to be bonded is permeable, the adhesive is applied to one of the surfaces and the surfaces are immediately joined. The solvent is absorbed into one or both of the substrates. If such a "wet stick" adhesive composition is not capable of initially holding together the surfaces being joined, it must be kept under pressure until enough strength has developed for subsequent handling.

Yet another method of bonding would be to coat one surface, completely or partially, dry and then bond the two surfaces desired with heat or pressure or both. Pressure-sensitive tape would be an example of an adhesive requiring subsequent pressure only. Delayed tack paper coatings are used that become pressure-sensitive on heating.

Yet another class of adhesive is similar to the pressure-sensitive or heat-seal type; but in this instance, the adhesive film or layer is reactivated with a small amount of organic solvent. Considerably less solvent is needed to reactivate an adhesive film than is used for the original coating.

Still another class of adhesives is the contact or "dry-stick" type. With this class, both surfaces to be bonded are coated and then dried. Bonding occurs immediately with pressure only.

Keeping the above in mind, adhesive selection is based on a combination of adhesive type and the particular requirements for the intended end use.

Thus, the adhesive should be capable of being applied within specified coating weight limits. Insufficient adhesive may not allow enough contact for required bond strength; whereas too much adhesive may retard the drying rate and also give low bond strength.

During application, the adhesive should not foam, skin, dry, coagulate, string or web. Of course, the adhesive should be stable for use with the equipment and have a considerably long pot life to allow for ease of clean-up both for equipment and surfaces.

In addition, the adhesive selected must have sufficient bond strength to work with the normal variables in stock and the temperatures and humidity range that will be encountered during usage. It must also meet the drying requirements, which can vary from simple ambient room temperature drying to large and highly engineered oven installations. The rate of strength developed for the drying conditions used must be sufficient for the next handling step to meet production rates.

The final bond strength, of course, must be sufficient for the particular end use requirements. On aging, the adhesive film must not be harmed by migration or chemical change from the materials being bonded. It must be capable of maintaining useful bond strengths at temperature extremes to which the bonded article may be exposed. Other requirements may be various degrees of water resistance, water proofness, and resistance to solvents, detergents, acids, alkalis and other chemicals.

The bond strength and end use requirements generally dictate the type of adhesives that can be used for a given application. The adhesive will then be selected from a class of compounds that will meet all of the requirements at the lowest possible finished cost per unit.

Keeping all of the above in mind, regardless of which adhesive formulation is desired to be used for a given end application, by virtue of the present invention, it is now possible to utilize adhesive coating compositions which desirably have a reduced amount of volatile solvents contained therein and which significantly reduce the amount of environmental pollution.

EXAMPLES

Example 1

A precursor adhesive coating composition that gives a thermoplastic acrylic adhesive coating that requires no cross-linking or baking was prepared from Rohm & Haas Acryloid® B-66 resin by dissolving the resin in methyl amyl ketone solvent. The precursor adhesive coating composition contained 35.00% solids fraction and 65.00% solvent fraction, with the following component composition:

| | | |
|---|---|---|
| Acryloid ® B-66 | 5,600.0 g | 35.00% |
| methyl amyl ketone | 10,400.0 g | 65.00% |
| Total | 16,000.0 g | 100.00% |

The precursor adhesive coating composition has the following properties:

| | | |
|---|---|---|
| Solvent content | 584 | grams/liter |
| Relative evap. rate | 40 | (butyl acetate = 100) |
| Viscosity | 316 | centipoise |
| Weight solids | 35.00 | percent |
| Liquid density | 898 | grams/liter |
| Molecular weight | 45,290 | weight average (Mw) |
| Molecular weight | 24,750 | number average (Mn) |
| Mw/Mn | 1.83 | |

The solvent fraction had the following distribution of solvent by relative evaporation rate:

| | |
|---|---|
| <50 | 100% |
| 50 to 100 | 0% |
| 101 to 250 | 0% |
| >250 | 0% |

The admixed liquid mixture was sprayed using a Nordson A7A circulating airless automatic spray gun with a Spraying Systems tip #500011 with a minimum cavity insert and also with Nordson tips #016-011, #016-012, #016-013, and #016-014, all of which have a 9-mil orifice size and the following fan width ratings.

| Spray Tip | Fan Width |
|---|---|
| 500011 | 8 inch |
| 016-011 | 2 inch |
| 016-012 | 4 inch |
| 016-013 | 6 inch |

| Spray Tip | Fan Width |
|---|---|
| 016-014 | 8 inch |

Spray experiments were done using Bonderite™ 37 polished 24-gauge steel test panels, 6-inch by 12-inch size. The test panels were sprayed in a vertical orientation. Adhesive coating thickness was measured after solvent evaporation by using a magnetic coating thickness meter (Paul N. Gardner Company, Fort Lauderdale, FL).

The precursor adhesive coating composition and carbon dioxide were pressurized, mixed, heated, and sprayed in the continuous mode. An admixed liquid mixture with a carbon dioxide content of 42% was sprayed at a pressure of 1600 psig and temperatures of 60 C. and 70 C., which gave a clear single-phase solution. The spray viscosity was about 20 centipoise (60 C.). Panels were sprayed using a Spraymation automatic sprayer and flashed. The adhesive coatings were uniform, clear, coherent, smooth, and bubble free. Adhesive coatings applied in one application did not sag until the thickness was above about 2.0 mil. Thicker adhesive coatings could be applied in multiple applications with a one-minute flash time between applications. The adhesive coatings had the following thicknesses after solvent evaporation:

| Temperature | Spray Tip | Coating Thickness |
|---|---|---|
| 60 C. | 500011 | 0.8 mil |
| 60 C. | 500011 | 1.2 mil |
| 60 C. | 500011 | 1.5 mil |
| 60 C. | 500011 | 2.1 mil |
| 60 C. | 500011 | 3.1 mil |
| 60 C. | 016-011 | 0.9 mil |
| 60 C. | 016-012 | 0.9 mil |
| 60 C. | 016-013 | 1.0 mil |
| 60 C. | 016-013 | 2.1 mil |
| 60 C. | 016-013 | 2.9 mil |
| 70 C. | 500011 | 0.8 mil |
| 70 C. | 500011 | 0.9 mil |
| 70 C. | 500011 | 1.2 mil |
| 70 C. | 500011 | 1.5 mil |
| 70 C. | 500011 | 1.8 mil |
| 70 C. | 500011 | 2.1 mil |
| 70 C. | 016-011 | 1.2 mil |
| 70 C. | 016-011 | 1.4 mil |
| 70 C. | 016-011 | 1.7 mil |
| 70 C. | 016-011 | 2.0 mil |
| 70 C. | 016-014 | 0.9 mil |
| 70 C. | 016-014 | 1.2 mil |
| 70 C. | 016-014 | 1.6 mil |
| 70 C. | 016-014 | 2.4 mil |

Using spray tip #026-012, liquid adhesive coating was sprayed onto two panels. Solvent was allowed to flash off and then the panels were joined together and bonded by the applied adhesive.

Example 2

A precursor adhesive coating composition that gives a thermoplastic acrylic adhesive coating that requires no cross-linking or baking was prepared from Rohm & Haas Acryloid B-66 resin by dissolving the resin in methyl amyl ketone solvent. The precursor adhesive coating composition contained 44.00% solids fraction and 56.00% solvent fraction, with the following component composition:

| | | |
|---|---|---|
| Acryloid B-66 | 7,040.0 g | 44.00% |
| methyl amyl ketone | 8,960.0 g | 56.00% |
| Total | 16,000.0 g | 100.00% |

The precursor adhesive coating composition had the following properties:

| | | |
|---|---|---|
| Solvent content | 516 | grams/liter |
| Relative evap. rate | 40 | (butyl acetate = 100) |
| Viscosity | 1060 | centipoise |
| Weight solids | 44.00 | percent |
| Liquid density | 922 | grams/liter |
| $CO_2$ solubility | 0.581 | percent (1 atmosphere) |
| Molecular weight | 45,290 | weight average (Mw) |
| Molecular weight | 24,750 | number average (Mn) |
| Mw/Mn | 1.83 | |

The solvent fraction had the following distribution of solvent by relative evaporation rate:

| | |
|---|---|
| <50 | 100% |
| 50 to 100 | 0% |
| 101 to 250 | 0% |
| >250 | 0% |

The admixed liquid mixture was sprayed using a Nordson A4B circulating airless hand gun with spray tip #0004/08, which has a 9-mil orifice size and an 8-inch fan width rating.

The precursor adhesive coating composition and carbon dioxide were pressurized, mixed, heated, and sprayed in the batch mode. An admixed liquid mixture with a carbon dioxide content of 44% was sprayed at a pressure of 1600 psig and a temperature of 50 C., which gave a clear single-phase solution. Panels were sprayed by hand and flashed. The adhesive coatings were uniform, clear, coherent, smooth, and bubble free. The adhesive coatings had thickness from 0.6 mil to 1.2 mil after solvent evaporation.

The admixed liquid mixture was also sprayed using a Nordson A7A circulating airless automatic spray gun with a Spraying Systems tip #500011 with a minimum cavity insert and also with Nordson tips #016-011, #016-012, #016-013, and #016-014, all of which have a 9-mil orifice size and the following fan width ratings:

| Spray Tip | Fan Width |
|---|---|
| 500011 | 8 inch |
| 016-011 | 2 inch |
| 016-012 | 4 inch |
| 016-014 | 8 inch |

The precursor adhesive coating composition and carbon dioxide were pressurized, mixed, heated, and sprayed in the continuous mode. An admixed liquid mixture with a carbon dioxide content of 42% was sprayed at a pressure of 1600 psig and temperatures of 60 C. and 70 C., which gave a clear single-phase solution but was near the solubility limit. Panels were sprayed using a Spraymation automatic sprayer and flashed. The polymeric adhesive coatings were uniform, clear, coherent, smooth, and bubble free. Thin coatings sometimes had pin holes. The adhesive coatings had the following thicknesses after solvent evaporation:

| Spray Tip | Coating Thickness |
|---|---|
| 500011 | 1.2 mil |
| 500011 | 1.6 mil |
| 500011 | 1.8 mil |
| 016-011 | 1.0 mil |
| 016-012 | 1.3 mil |
| 016-012 | 1.4 mil |
| 016-014 | 1.2 mil |
| 016-014 | 1.4 mil |
| 016-014 | 1.9 mil |

Example 3

A precursor adhesive coating composition that gives a thermoplastic cellulose acetate butyrate (CAB) adhesive coating that requires no cross-linking or baking was prepared by dissolving Eastman Chemical Cellulose Ester CAB-381-0.1 in methyl amyl ketone solvent. The precursor adhesive coating composition contained 25.8% solids fraction and 74.2% solvent fraction, with the following component composition:

| | | |
|---|---|---|
| CAB | 923.0 g | 25.8% |
| methyl amyl ketone | 2,655.0 g | 74.2% |

The solvent fraction had a relative evaporation rate of 40 (butyl acetate=100). The precursor adhesive coating composition had the following properties:

| | | |
|---|---|---|
| Solvent content | 672 | grams/liter |
| Relative evap. rate | 40 | (butyl acetate = 100) |
| Weight solids | 25.8 | percent |
| Viscosity | >1000 | centipoise (23 C.) |
| | 330 | centipoise (50 C.) |
| Liquid density | 905 | grams/liter |
| Molecular weight | 45,260 | weight average (Mw) |
| Molecular weight | 19,630 | number average (Mn) |
| Mw/Mn | 2.31 | |

The solvent fraction had the following distribution of solvent by relative evaporation rate:

| | |
|---|---|
| <50 | 100% |
| 50 to 100 | 0% |
| 101 to 250 | 0% |
| >250 | 0% |

The admixed liquid mixture was sprayed using a Nordson A4B circulating airless hand gun with spray tip #0004/10, which has a 9-mil orifice size and a 10-inch fan width rating.

The precursor adhesive coating composition and carbon dioxide were pressurized, mixed, heated, and sprayed in the batch mode. An admixed liquid mixture with a carbon dioxide content of 28% was sprayed at a pressure of 1600 psig and a temperature of 50 C., which gave a clear single-phase solution. Panels were sprayed by hand and flashed. The adhesive polymeric coatings were thin, uniform, smooth, and bubble free. Adhesive coatings were sprayed with thicknesses of 0.7 to 0.8 mil after solvent evaporation. Because the admixed liquid mixture was so readily sprayable at a carbon dioxide content that is well below the solubility limit, this shows that the preferred precursor adhesive coating composition would have a lower proportion of solvent and a higher proportion of solids and that the admixed liquid mixture should contain a higher concentration of carbon dioxide to better utilize the supercritical fluid.

Example 4

A precursor adhesive coating composition that gives a thermoplastic cellulose acetate butyrate (CAB) adhesive coating that requires no cross-linking or baking was prepared by dissolving Eastman Chemical Cellulose Ester CAB-381-0.1 in solvents methyl amyl ketone, methyl ethyl ketone, and butyl CELLOSOLVE acetate (BCA). The precursor adhesive coating composition contained 25.00% solids fraction and 75.00% solvent fraction, with the following component composition:

| CAB | 4,800.0 g | 25.00% |
|---|---|---|
| methyl ethyl ketone | 4,480.0 g | 23.33% |
| methyl amyl ketone | 6,720.0 g | 35.00% |
| BCA | 3,200.0 g | 16.67% |
| Total | 19,200.0 g | 100.00% |

The solvent fraction had the following composition and relative evaporation rates (butyl acetate = 100):

| Solvent | Grams | Wt % | RER |
|---|---|---|---|
| methyl ethyl ketone | 4,480.0 g | 31.11% | 631 |
| methyl amyl ketone | 6,720.0 g | 46.67% | 40 |
| BCA | 3,200.0 g | 22.22% | 3 |

The precursor adhesive coating composition had the following properties:

| Solvent content | 678 grams/liter |
|---|---|
| Relative evap. rate | 12 (butyl acetate = 100) |
| Viscosity | 347 centipoise |
| Weight solids | 25.00 percent |
| Liquid density | 905 grams/liter |
| Molecular weight | 45,260 weight average (Mw) |
| Molecular weight | 19,630 number average (Mn) |
| Mw/Mn | 2.31 |

The solvent fraction had the following distribution of solvent by relative evaporation rate:

| <50 | 69% |
|---|---|
| 50 to 100 | 0% |
| 101 to 250 | 0% |
| >250 | 31% |

The admixed liquid mixture was sprayed using a Nordson A7A circulating airless automatic spray gun with a Spraying Systems tip #500011 with a minimum cavity insert, which has a 9-mil orifice size. The precursor adhesive coating composition and carbon dioxide were pressurized, mixed, heated, and sprayed in the continuous mode. An admixed liquid mixture with a carbon dioxide content of about 36% was sprayed at a pressure of 1600 psig and a temperature of 60 C., which gave a clear single-phase solution. Panels were sprayed using a Spraymation automatic sprayer and flashed. The adhesive polymeric coatings were uniform, coherent, smooth, and bubble free. Adhesive coatings were sprayed with thicknesses of 0.5 to 1.0 mil after solvent evaporation; thicker coatings were obtained by applying multiple coats. Liquid adhesive coating was sprayed onto two panels. Solvent was allowed to flash off and then the panels were joined together and bonded by the applied adhesive.

Because the admixed liquid mixture was so readily sprayable at a carbon dioxide content that is significantly below the solubility limit, this shows that the preferred precursor adhesive coating composition would eliminate the very fast solvent, namely methyl ethyl ketone, and have an overall lower proportion of solvent and a higher proportion of solids, and that the admixed liquid mixture should contain a higher concentration of carbon dioxide to better utilize the supercritical fluid.

Example 5

(Comparison Example)

This example is not in accordance with the present invention inasmuch as too much fast solvent is utilized.

A precursor adhesive coating composition that gives a thermoplastic cellulose acetate butyrate (CAB) adhesive coating that requires no cross-linking or baking was prepared by dissolving Eastman Chemical Cellulose Ester CAB-381-0.1 in solvents methyl amyl ketone and methyl ethyl ketone. The precursor adhesive coating composition contained 30.00% solids fraction and 70.00% solvent fraction, with the following component composition:

| CAB | 4,800.0 g | 30.00% |
|---|---|---|
| methyl ethyl ketone | 4,480.0 g | 28.00% |
| methyl amyl ketone | 6,720.0 g | 42.00% |

The solvent fraction had the following composition and relative evaporation rates (butyl acetate = 100):

| Solvent | Grams | Wt % | RER |
|---|---|---|---|
| methyl ethyl ketone | 4,480.0 g | 40.00% | 631 |
| methyl amyl ketone | 6,720.0 g | 60.00% | 40 |

The precursor adhesive coating composition had the following properties:

| Solvent content | 629 grams/liter |
|---|---|
| Relative evap. rate | 64 (butyl acetate = 100) |
| Viscosity | 1292 centipoise |
| Weight solids | 30.00 percent |
| Liquid density | 899 grams/liter |
| CO2 solubility | 0.714 percent (1 atmosphere) |
| Molecular weight | 45,260 weight average (Mw) |
| Molecular weight | 19,630 number average (Mn) |
| Mw/Mn | 2.31 |

The solvent fraction had the following distribution of solvent by relative evaporation rate:

| <50 | 60% |
|---|---|
| 50 to 100 | 0% |
| 101 to 250 | 0% |
| >250 | 40% |

The admixed liquid mixture was sprayed using a Nordson A7A circulating airless automatic spray gun with a Spraying Systems tip #500011 with a minimum cavity insert, which has a 9-mil orifice size. The precursor adhesive coating composition and carbon dioxide were pressurized, mixed, heated, and sprayed in the continuous mode. An admixed liquid mixture with a carbon dioxide content of about 48% was sprayed at a pressure of 1600 psig and a temperature of 60 C., which gave a clear single-phase solution. Panels were sprayed using a Spraymation automatic sprayer and flashed. Due to the large percentage of very fast solvent, no coherent liquid adhesive coatings could be applied, because the liquid adhesive coating had much too little fluidity, due to solvent loss in the spray, when it reached the substrate for the liquid adhesive coating to flow together.

Because the admixed liquid mixture was so readily atomizable at a carbon dioxide content that is close to the solubility limit, the difficulty being rapid solvent loss in the spray, this shows that the preferred precursor adhesive coating composition would eliminate the very fast solvent, namely methyl ethyl ketone, and have an overall lower proportion of solvent and a higher proportion of solids, which would enable the coating to flow together while enhancing the ability to build adhesive coating thickness without causing the wet coating to run or sag. This better utilizes the supercritical fluid.

Example 6

A precursor adhesive coating composition that gives a thermosetting acrylic adhesive coating was prepared from Rohm & Haas Acryloid AT-400 resin, which contains 75% nonvolatile acrylic polymer dissolved in 25% methyl amyl ketone solvent, and American Cyanamid Cymel 323 resin, which is a cross-linking agent that contains 80% nonvolatile melamine polymer dissolved in 20% isobutanol solvent, by mixing the resins with the solvents n-butanol and methyl amyl ketone in the following proportions:

| | |
|---|---|
| Acryloid AT-400 | 8,694.0 g |
| Cymel 323 | 2,718.0 g |
| n-butanol | 626.0 g |
| methyl amyl ketone | 1,336.0 g |
| Total | 13,374.0 g |

The precursor adhesive coating composition contained 65.01% solids fraction and 34.99% solvent fraction, with the following component composition:

| | | |
|---|---|---|
| AT-400 polymer | 6,520.5 g | 48.75% |
| Cymel 323 polymer | 2,174.4 g | 16.26% |
| isobutanol | 543.6 g | 4.07% |
| n-butanol | 626.0 g | 4.68% |
| methyl amyl ketone | 3,509.5 g | 26.24% |
| Total | 13,374.0 g | 100.00% |

The solids fraction had the following composition:

| | | |
|---|---|---|
| AT-400 polymer | 6,520.5 g | 74.99% |
| Cymel 323 polymer | 2,174.4 g | 25.01% |
| Total | 8,694.9 g | 100.00% |

The solvent fraction had the following composition and relative evaporation rates (butyl acetate = 100):

| Solvent | Grams | Wt % | RER |
|---|---|---|---|
| isobutanol | 543.6 g | 11.62% | 74 |
| n-butanol | 626.0 g | 13.38% | 44 |
| methyl amyl ketone | 3,509.5 g | 75.00% | 40 |
| Total | 4,679.1 g | 100.00% | |

The precursor adhesive coating composition had the following properties:

| | | |
|---|---|---|
| Solvent content | 350 | grams/liter |
| Relative evap. rate | 43 | (butyl acetate = 100) |
| Viscosity | 940 | centipoise |
| Weight solids | 65.01 | percent |
| Liquid density | 999 | grams/liter |
| Acryloid AT-400 | | |
| Molecular weight | 9,280 | weight average (Mw) |
| Molecular weight | 3,270 | number average (Mn) |
| Mw/Mn | 2.84 | |
| Cymel 323 | | |
| Molecular weight | 490 | weight average (Mw) |
| Molecular weight | 410 | weight average (Mn) |
| Mw/Mn | 1.20 | |

The solvent fraction had the following distribution of solvent by relative evaporation rate:

| | |
|---|---|
| <50 | 88% |
| 50 to 100 | 12% |
| 101 to 250 | 0% |
| >250 | 0% |

The admixed liquid mixture was sprayed using a Nordson A4b circulating airless hand spray gun model with a Spraying Systems tip #500011 with a minimum cavity insert, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 27.3% was sprayed at a temperature of 67 C. and a pressure of 1900 psig, which gave a clear single-phase solution but was near the solubility limit. Panels were sprayed using a Spraymation automatic sprayer, flashed, and baked, in order to measure adhesive coating thickness after the adhesive is cross-linked. The adhesive polymeric coatings were uniform, clear, coherent, smooth, and bubble free. Adhesive coating thicknesses ranged from 1.5 to 2.8 mil.

Example 7

A precursor adhesive coating composition that gives a thermosetting acrylic adhesive coating was prepared from Acryloid AT-400 resin and Cymel 323 resin by mixing the resins with the solvents n-butanol, ethyl 3-ethoxypropionate (EEP), xylene, butyl CELLOSOLVE acetate (BCA), and aromatic 100 in the following proportions:

| | |
|---|---|
| Acryloid AT-400 | 8,694.0 g |
| Cymel 323 | 2,718.0 g |
| n-butanol | 265.0 g |
| EEP | 450.0 g |
| xylene | 312.0 g |
| aromatic 100 | 30.0 g |
| BCA | 20.0 g |
| 1% L5310 in xylene | 10.0 g |
| Total | 12,499.0 g |

L5310 is a Union Carbide silicone surfactant. The precursor adhesive coating composition contained 69.56% solids fraction and 30.44% solvent fraction, with the following component composition:

| | | |
|---|---|---|
| AT-400 polymer | 6,520.5 g | |
| Cymel 323 polymer | 2,174.4 g | |
| isobutanol | 543.6 g | |
| n-butanol | 265.0 g | |
| methyl amyl ketone | 2,173.5 g | |
| EEP | 450.0 g | |
| xylene | 321.9 g | |
| aromatic 100 | 30.0 g | |
| BCA | 20.0 g | |
| L5310 | 0.1 g | |
| Total | 12,499.0 g | |

The solids fraction had the following composition:

| | | |
|---|---|---|
| AT-400 polymer | 6,520.5 g | 74.99% |
| Cymel 323 polymer | 2,174.4 g | 25.01% |
| Total | 8,694.9 g | 100.00% |

The solvent fraction had the following composition and relative evaporation rates (butyl acetate=100):

| Solvent | Grams | Wt % | RER |
|---|---|---|---|
| isobutanol | 543.6 g | 14.29% | 74 |
| xylene | 321.9 g | 8.46% | 70 |
| n-butanol | 265.0 g | 6.97% | 44 |
| methyl amyl ketone | 2,173.5 g | 57.13% | 40 |
| aromatic 100 | 30.0 g | 0.79% | 20 |
| EEP | 450.0 g | 11.83% | 11 |
| BCA | 20.0 g | 0.53% | 3 |
| Total | 3,804.0 g | 100.00% | |

The precursor adhesive coating composition had the following properties:

| | |
|---|---|
| Solvent content | 312 grams/liter |
| Relative evap. rate | 31 (butyl acetate = 100) |
| Viscosity | 3500 centipoise (60 rpm) |
| | 2400 centipoise (6 rpm) |
| Weight solids | 69.56 percent |
| Liquid density | 1025 grams/liter |
| Acryloid AT-400 | |
| Molecular weight | 9,280 weight average (Mw) |
| Molecular weight | 3,270 number average (Mn) |
| Mw/Mn | 2.84 |

The solvent fraction had the following distribution of solvent by relative evaporation rate:

| | |
|---|---|
| <50 | 77% |
| 50 to 100 | 23% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 30% was sprayed at a temperature of 67 C. and a pressure of 1900 psig, which gave a clear single-phase solution but was near the solubility limit. Panels were sprayed using a Spraymation automatic sprayer, flashed, and baked, in order to measure adhesive coating thickness after the adhesive is cross-linked. The adhesive polymeric coatings were uniform, clear, coherent, smooth, and bubble free. Adhesive coating thicknesses ranged from 1.5 to 2.8 mil.

Example 8

A precursor adhesive coating composition that gives a thermosetting acrylic coating was prepared from Acryloid AT-400 resin, Rohm & Haas Acryloid AT-954 resin, which contains 80% nonvolatile acrylic polymer dissolved in 20% methyl amyl ketone solvent, and Cymel 323 resin, by mixing the resins with the solvents n-butanol, ethyl 3-ethoxypropionate (EEP), methyl amyl ketone, and xylene in the following proportions:

| | |
|---|---|
| Acryloid AT-400 | 6,520.5 g |
| Acryloid AT-954 | 1,917.8 g |
| Cymel 323 | 2,718.0 g |
| n-butanol | 626.0 g |
| EEP | 889.0 g |
| methyl amyl ketone | 320.0 g |
| xylene | 39.0 g |
| Total | 13,030.3 g |

The precursor adhesive coating composition contained 66.73% solids fraction and 32.97% solvent fraction, with the following component composition:

| | | |
|---|---|---|
| AT-400 polymer | 4,890.4 g | 37.53% |
| AT-954 polymer | 1,630.1 g | 12.51% |
| Cymel 323 polymer | 2,174.4 g | 16.69% |
| isobutanol | 543.6 g | 4.17% |
| xylene | 39.0 g | 0.30% |
| n-butanol | 626.0 g | 4.80% |
| methyl amyl ketone | 2,237.8 g | 17.18% |
| EEP | 889.0 g | 6.82% |
| Total | 13,030.0 g | 100.00% |

The solids fraction had the following composition:

| | | |
|---|---|---|
| AT-400 polymer | 4,890.4 g | 56.24% |
| AT-954 polymer | 1,630.1 g | 18.75% |
| Cymel 323 polymer | 2,174.4 g | 25.01% |
| Total | 8,694.9 g | 100.00% |

The solvent fraction had the following composition and relative evaporation rates (butyl actate=100):

| Solvent | Grams | Wt % | RER |
|---|---|---|---|
| isobutanol | 543.6 g | 12.54% | 74 |
| xylene | 39.0 g | 0.90% | 70 |
| n-butanol | 626.0 g | 14.44% | 44 |
| methyl amyl ketone | 2,237.8 g | 51.61% | 40 |
| EEP | 889.0 g | 20.51% | 11 |
| Total | 4,335.4 g | 100.00% | |

The precursor adhesive coating composition had the following properties:

| | |
|---|---|
| Solvent content | 336 grams/liter |
| Relative evap. rate | 27 (butyl acetate = 100) |
| Viscosity | 670 centipoise |
| Weight solids | 66.73% percent |

-continued

| | | |
|---|---|---|
| Liquid density | 1013 | grams/liter |
| CO2 solubility | 0.359 | percent (1 atmosphere) |
| Acryloid AT-400 | | |
| Molecular weight | 9,280 | weight average (Mw) |
| Molecular weight | 3,270 | number average (Mn) |
| Mw/Mn | 2.84 | |
| Acryloid AT-954 | | |
| Molecular weight | 6,070 | weight average (Mw) |
| Molecular weight | 1,670 | number average (Mn) |
| Mw/Mn | 3.63 | (bimodal) |

The solvent fraction had the following distribution of solvent by relative evaporation rate:

| | |
|---|---|
| <50 | 87% |
| 50 to 100 | 13% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 30% was sprayed at a various temperatures and pressures, all of which gave a clear single-phase solution. The viscosity was about 7–10 centipoise. Panels were sprayed using a Spraymation automatic sprayer, flashed, and baked, in order to measure adhesive coating thickness after the adhesive is cross-linked. The adhesive polymeric coatings were uniform, clear, coherent, smooth, and bubble free. Adhesive coating thicknesses are given below:

| Pressure | Coating Thickness |
|---|---|
| Temperature = 60 C. | |
| 1600 psi | 1.10 mil |
| 1600 psi | 1.20 mil |
| 1600 psi | 1.30 mil |
| 1600 psi | 1.35 mil |
| 1600 psi | 1.50 mil |
| 1600 psi | 1.55 mil |
| 1600 psi | 1.60 mil |
| 1600 psi | 1.70 mil |
| 1600 psi | 1.77 mil |
| 1600 psi | 2.00 mil |
| Temperature = 55 C. | |
| 1350 psi | 1.20 mil |
| 1350 psi | 1.42 mil |
| 1350 psi | 1.70 mil |
| 1350 psi | 2.10 mil |
| 1575 psi | 1.46 mil |
| 1575 psi | 1.70 mil |
| 1575 psi | 1.90 mil |
| 1950 psi | 1.50 mil |
| 1950 psi | 1.80 mil |
| 1950 psi | 2.10 mil |

Liquid adhesive coating was sprayed onto two panels. Solvent was allowed to flash off and then the panels were joined together and bonded by the applied adhesive by baking them in an oven at a temperature of 120 C. for twenty minutes to cross-link the adhesive.

Example 9

A precursor adhesive coating composition that gives a thermosetting acrylic adhesive coating but contains excessive solvent was prepared from Acryloid AT-400 resin, Acryloid AT-954 resin, and Cymel 323 resin, by mixing the resins with the solvents n-butanol, ethyl 3-ethoxypropionate (EEP), methyl amyl ketone, and xylene in the following proportions:

| | |
|---|---|
| Acryloid AT-400 | 4,096.2 g |
| Acryloid AT-954 | 1,204.8 g |
| Cymel 323 | 1,707.5 g |
| n-butanol | 393.3 g |
| EEP | 558.5 g |
| methyl amyl ketone | 3,015.3 g |
| xylene | 24.5 g |
| 50% L5310 in xylene | 32.9 g |
| Total | 11,033.0 g |

The precursor adhesive coating composition contained 49.51% solids fraction and 50.49% solvent fraction, with the following component composition:

| | | |
|---|---|---|
| AT-400 polymer | 3,072.2 g | 27.85% |
| AT-954 polymer | 1,024.1 g | 9.28% |
| Cymel 323 polymer | 1,366.0 g | 12.38% |
| isobutanol | 341.5 g | 3.10% |
| xylene | 41.0 g | 0.37% |
| n-butanol | 393.3 g | 3.57% |
| methyl amyl ketone | 4,220.1 g | 38.25% |
| EEP | 558.5 g | 5.06% |
| L5310 | 16.4 g | 0.14% |
| Total | 11,033.1 g | 100.00% |

The solids fraction had the following composition:

| | | |
|---|---|---|
| AT-400 polymer | 3,072.2 g | 56.24% |
| AT-954 polymer | 1,024.1 g | 18.75% |
| Cymel 323 polymer | 1,366.0 g | 25.01% |

The solvent fraction had the following composition and relative evaporation rates (butyl acetate = 100):

| Solvent | Grams | Wt % | RER |
|---|---|---|---|
| isobutanol | 341.5 g | 6.15% | 74 |
| xylene | 41.0 g | 0.74% | 70 |
| n-butanol | 393.3 g | 7.08% | 44 |
| methyl amyl ketone | 4,220.1 g | 75.97% | 40 |
| EEP | 558.5 g | 10.06% | 11 |
| Total | 5,554.4 g | 100.00% | |

The precursor adhesive coating composition had the following properties:

| | | |
|---|---|---|
| Solvent content | 482 | grams/liter |
| Relative evap. rate | 33 | (butyl acetate = 100) |
| Viscosity | 62 | centipoise |
| Weight solids | 49.51 | percent |
| Liquid density | 955 | grams/liter |
| CO2 solubility | 0.417 | percent (1 atmosphere) |
| Acryloid AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 93% |
| 50 to 100 | 7% |
| 101 to 250 | 0% |
| >250 | 0% |

The admixed liquid mixture was sprayed using a Nordson A7A circulating airless automatic spray gun with spray tip 016–014, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 30% was sprayed at a temperature of 60 C. and a pressures of 1200 and 1600 psig, all of which gave a clear single-phase solution. The viscosity was about 5 centipoise. Panels were sprayed using a Spraymation automatic sprayer, flashed, and baked. The polymeric adhesive coatings were more uneven than in Example 8 and some of the adhesive coatings contained bubbles. Some coatings had bubbles and the surfaces were pitted. In order to obtain the same adhesive coating thickness, it was necessary to spray much more material than in Examples 8, which contained less solvent.

Example 10

(Comparison Example)

This example is not in accordance with the present invention inasmuch as too much fast solvent is utilized.

A precursor adhesive coating composition that gives a thermosetting acrylic coating but contains both fast solvent and excessive solvent was prepared from Acryloid AT-400 resin, Acryloid AT-954 resin, and Cymel 323 resin, by mixing the resins with the solvents n-butanol, ethyl 3ethoxypropionate (EEP), methyl amyl ketone, methyl ethyl ketone, and xylene:

| | |
|---|---|
| Acryloid AT-954 | 1,197.9 g |
| Acryloid AT-400 | 4,072.9 g |
| Cymel 323 | 1,697.8 g |
| n-butanol | 391.0 g |
| EEP | 555.3 g |
| methyl amyl ketone | 199.9 g |
| methyl ethyl ketone | 2,860.8 g |
| xylene | 24.4 g |
| 50% L5310 in xylene | 32.9 g |
| Total | 11,032.9 g |

The precursor adhesive coating composition contained 49.23% solids fraction and 50.77% solvent fraction, with the following component composition:

| | | |
|---|---|---|
| AT-954 polymer | 1,018.2 g | 9.23% |
| AT-400 polymer | 3,054.7 g | 27.69% |
| Cymel 323 polymer | 1,358.2 g | 12.31% |
| methyl ethyl ketone | 2,860.8 g | 25.93% |
| isobutanol | 339.6 g | 3.08% |
| xylene | 40.9 g | 0.37% |
| n-butanol | 391.0 g | 3.54% |
| methyl amyl ketone | 1,397.8 g | 12.67% |
| EEP | 555.3 g | 5.03% |
| L5310 | 16.4 g | 0.15% |
| Total | 11,032.9 g | 100.00% |

The solids fraction had the following composition:

| | | |
|---|---|---|
| AT-954 polymer | 1,018.2 g | 18.75% |
| AT-400 polymer | 3,054.7 g | 56.24% |
| Cymel 323 polymer | 1,358.2 g | 25.01% |

The solvent fraction had the following composition and relative evaporation rates (butyl acetate = 100):

| Solvent | Grams | Wt % | RER |
|---|---|---|---|
| methyl ethyl ketone | 2,860.8 g | 51.22% | 631 |
| isobutanol | 339.6 g | 6.08% | 74 |
| xylene | 40.9 g | 0.74% | 70 |
| n-butanol | 391.0 g | 7.00% | 44 |
| methyl amyl ketone | 1,397.8 g | 25.02% | 40 |
| EEP | 555.3 g | 9.94% | 11 |

The precursor adhesive coating composition had the following properties:

| | | |
|---|---|---|
| Solvent content | 482 | grams/liter |
| Relative evap. rate | 54 | (butyl acetate = 100) |
| Viscosity | 32 | centipoise |
| Weight solids | 49.23 | percent |
| Liquid density | 953 | grams/liter |
| Acryloid AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 42% |
| 50 to 100 | 7% |
| 101 to 250 | 0% |
| >250 | 51% |

The admixed liquid mixture was sprayed using a Nordson A7A circulating airless automatic spray gun with tip #016–014, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 30% was sprayed at a temperature of 60 C. and pressures of 1200 and 1600 psig, which gave a clear single-phase solution. The viscosity was less than 3 centipoise. Panels were sprayed using a Spraymation automatic sprayer, flashed, and baked. The adhesive polymeric coatings were of poor quality. The liquid adhesive coatings had a hazy appearance, which was caused by fine bubbles in the coating. Much more spraying was required to build up film thickness than in Example 8, which contained much less solvent, such that thick coatings could not be produced within the operating limits of the Spraymation automatic sprayer for applying a single coat.

Example 11

A precursor adhesive coating composition that gives a thermosetting polyester adhesive coating was prepared from Spencer Kellog Aroplaz 6025-A6-80 resin, which contains 80% nonvolatile polyester polymer dissolved in 20% methyl PROPASOL acetate (MPA) solvent, and Cymel 323 resin, by mixing the resins with the solvents n-butanol and butyl CELLOSOLVE acetate (BCA) in the following proportions:

| Aroplaz 6025-A6-80 | 11,000.0 g |
| --- | --- |
| Cymel 323 | 3,666.7 g |
| n-butanol | 450.0 g |
| BCA | 2,250.0 g |
| 50% L5310 in xylene | 75.0 g |
| Total | 17,441.7 g |

The precursor adhesive coating composition contained 67.27% solids fraction and 32.73% solvent fraction, with the following component composition:

| Aroplaz polymer | 8,800.0 g | 50.45% |
| --- | --- | --- |
| Cymel 323 polymer | 2,933.4 g | 16.82% |
| isobutanol | 733.3 g | 4.20% |
| xylene | 37.5 g | 0.22% |
| n-butanol | 450.0 g | 2.58% |
| MPA | 2,200.0 g | 12.61% |
| BCA | 2,250.0 g | 12.90% |
| L5310 | 37.5 g | 0.22% |
| Total | 17,441.7 g | 100.00% |

The solids fraction had the following composition:

| Aroplaz polymer | 8,800.0 g | 75.00% |
| --- | --- | --- |
| Cymel 323 polymer | 2,933.4 g | 25.00% |

The solvent fraction had the following composition and relative evaporation rates (butyl acetate=100):

| Solvent | Grams | Wt % | RER |
| --- | --- | --- | --- |
| isobutanol | 733.3 g | 12.94% | 74 |
| xylene | 37.5 g | 0.66% | 70 |
| n-butanol | 450.0 g | 7.93% | 44 |
| MPA | 2,200.0 g | 38.80% | 34 |
| BCA | 2,250.0 g | 39.67% | 3 |

The precursor adhesive coating composition had the following properties:

| Solvent content | 360 | grams/liter |
| --- | --- | --- |
| Relative evap. rate | 7 | (butyl acetate = 100) |
| Viscosity | 990 | centipoise |
| Weight solids | 67.27 | percent |
| Liquid density | 1111 | grams/liter |
| $CO_2$ solubility | 0.339 | percent (1 atmosphere) |
| Polyester | | |
| Molecular weight | 3,270 | weight average (Mw) |
| Molecular weight | 2,000 | number average (Mn) |
| Mw/Mn | 1.64 | |

The solvent fraction had the following distribution of solvent by relative evaporation rate:

| <50 | 86% |
| --- | --- |
| 50 to 100 | 14% |
| 101 to 250 | 0% |
| >250 | 0% |

The admixed liquid mixture was sprayed using a Nordson A7A circulating airless automatic spray gun with a Spraying Systems tip #500011 with a minimum cavity insert and also with Nordson tips #016-011 and #016-012, all of which have a 9-mil orifice size and width ratings of 8, 2, and 4 inches, respectively.

The precursor adhesive coating composition and carbon dioxide were pressurized, mixed, heated, and sprayed in the continuous mode. An admixed liquid mixture with a carbon dioxide content of 25.5% was sprayed at a temperature of 70 C. and pressure of 1600 psi, which gave a clear single-phase solution. Panels were sprayed using a Spraymation automatic sprayer, flashed, and baked, in order to measure adhesive coating thickness after the adhesive is cross-linked. The adhesive polymeric coatings were uniform, clear, coherent, smooth, and bubble free. Some of the coatings had a slight haze right after being sprayed, but this disappeared quickly during the three-minute flash period. The adhesive coatings had the following thicknesses:

| Spray Tip | Coating Thickness |
| --- | --- |
| 500011 | 1.0 mil |
| 500011 | 1.2 mil |
| 500011 | 1.3 mil |
| 500011 | 1.6 mil |
| 500011 | 1.7 mil |
| 500011 | 1.8 mil |
| 500011 | 2.3 mil |
| 016-011 | 1.0 mil |
| 016-011 | 1.2 mil |
| 016-011 | 1.5 mil |
| 016-011 | 1.9 mil |
| 016-012 | 1.0 mil |
| 016-012 | 1.2 mil |
| 016-012 | 1.5 mil |
| 016-012 | 2.0 mil |

Example 12

A precursor adhesive coating composition that give a thermosetting polyester/acrylic adhesive coating was prepared from Aroplaz 6026-A6-80 resin, Acryloid AT-400 resin, and Cymel 323 resin, by mixing the resins with the solvents n-butanol, ethyl 3-ethoxypropionate (EEP), and butyl CELLOSOLVE acetate (BCA) in the following proportions:

| Aroplaz 6025-A6-80 | 4,510.8 g |
| --- | --- |
| Acryloid AT-400 | 2,405.6 g |
| Cymel 323 | 2,255.3 g |
| n-butanol | 276.8 g |
| EEP | 880.0 g |
| BCA | 500.0 g |
| 50% L5310 in xylene | 200.0 g |
| Total | 11,028.5 g |

The precursor adhesive coating composition contained 65.44% solids fraction and 34.56% solvent fraction, with the following component composition:

| Aroplaz polymer | 3,608.6 g | 32.72% |
| --- | --- | --- |
| AT-400 polymer | 1,804.2 g | 16.36% |
| Cymel 323 polymer | 1,804.2 g | 16.36% |
| isobutanol | 451.1 g | 4.09% |
| xylene | 100.0 g | 0.91% |
| n-butanol | 276.8 g | 2.51% |
| methyl amyl ketone | 601.4 g | 5.45% |
| MPA | 902.2 g | 8.18% |
| EEP | 880.0 g | 7.98% |
| BCA | 500.0 g | 4.53% |
| L5310 | 100.0 g | 0.91% |
| Total | 11,028.5 g | 100.00% |

The solids fraction had the following composition:

| | | |
|---|---|---|
| Aroplaz polymer | 3,608.6 g | 50.00% |
| AT-400 Polymer | 1,804.2 g | 25.00% |
| Cymel 323 polymer | 1,804.2 g | 25.00% |

The solvent fraction had the following composition and relative evaporation rates (butyl acetate = 100):

| Solvent | Grams | Wt % | RER |
|---|---|---|---|
| isobutanol | 451.1 g | 12.16% | 74 |
| xylene | 100.0 g | 2.69% | 70 |
| n-butanol | 276.8 g | 7.46% | 44 |
| methyl amyl ketone | 601.4 g | 16.20% | 40 |
| MPA | 902.2 g | 24.31% | 34 |
| EEP | 880.0 g | 23.71% | 11 |
| BCA | 500.0 g | 13.47% | 3 |

The precursor adhesive coating composition had the following properties:

| | | |
|---|---|---|
| Solvent content | 360 | grams/liter |
| Relative evap. rate | 12 | (butyl acetate = 100) |
| Viscosity | 599 | centipoise |
| Weight solids | 65.44 | percent |
| Liquid density | 1040 | grams/liter |
| Polyester | | |
| Molecular weight | 3,270 | weight average (Mw) |
| Molecular weight | 2,000 | number average (Mn) |
| Mw/Mn | 1.64 | |
| Acryloid AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 85% |
| 50 to 100 | 15% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 25.8% was sprayed at a temperature of 69 C. and pressure of 1600 psi, which gave a clear single-phase solution. Panels were sprayed using a Spraymation automatic sprayer, flashed, and baked in order to measure adhesive coating thickness after the adhesive is cross-linked. The adhesive polymeric coatings were uniform, clear, coherent, smooth, and bubble free. Some of the coatings had a slight haze right after being sprayed, but this disappeared quickly during the three-minute flash period. The adhesive coatings had thicknesses of from below 1.0 mil to above 2.0 mil.

Example 13

A precursor adhesive coating composition that gives a thermosetting polyester/acrylic adhesive coating was prepared from Aroplaz 6025-A6-80 resin, Acryloid AT-400 resin, and Cymel 323 resin, by mixing the resins with the solvents n-butanol, ethyl 3-ethoxypropionate (EEP), butyl CELLOSOLVE acetate (BCA), and L5310 surfactant in xylene, in the following proportions:

| | |
|---|---|
| Aroplaz 6025-A6-80 | 4,510.8 g |
| Acryloid AT-400 | 2,405.6 g |
| Cymel 323 | 2,255.3 g |
| n-butanol | 276.8 g |
| EEP | 500.0 g |
| BCA | 500.0 g |
| 50% L5310 in xylene | 161.5 g |
| Total | 10,610.0 g |

The precursor adhesive coating composition contained 68.79% solids fraction and 31.21% solvent fraction, with the following component composition:

| | | |
|---|---|---|
| Aroplaz polymer | 3,608.6 g | 34.01% |
| AT-400 polymer | 1,804.2 g | 17.01% |
| Cymel 323 polymer | 1,804.2 g | 17.01% |
| isobutanol | 451.1 g | 4.25% |
| xylene | 80.8 g | 0.76% |
| n-butanol | 276.8 g | 2.61% |
| methyl amyl ketone | 601.4 g | 5.67% |
| MPA | 902.2 g | 8.50% |
| EEP | 500.0 g | 4.71% |
| BCA | 500.0 g | 4.71% |
| L5310 | 80.7 g | 0.76% |
| Total | 10,610.0 g | 100.00% |

The solids fraction had the following composition:

| | | |
|---|---|---|
| Aroplaz ™ polymer | 3,608.6 g | 50.00% |
| AT-400 polymer | 1,804.2 g | 25.00% |
| Cymel ™ 323 polymer | 1,804.2 g | 25.00% |

The solvent fraction had the following composition and relative evaporation rates (butyl acetate = 100):

| Solvent | Grams | Wt % | RER |
|---|---|---|---|
| isobutanol | 451.1 g | 12.16% | 74 |
| xylene | 100.0 g | 2.69% | 70 |
| n-butanol | 276.8 g | 7.46% | 44 |
| methyl amyl ketone | 601.4 g | 16.20% | 40 |
| MPA | 902.2 g | 24.31% | 34 |
| EEP | 880.0 g | 23.71% | 11 |
| BCA | 500.0 g | 13.47% | 3 |

The precursor adhesive coating composition had the following properties:

| | | |
|---|---|---|
| Solvent content | 360 | grams/liter |
| Relative evap. rate | 12 | (butyl acetate = 100) |
| Viscosity | >599 | centipoise |
| Weight solids | 65.44 | percent |
| Liquid density | 1040 | grams/liter |
| Polyester | | |
| Molecular weight | 3,270 | weight average (Mw) |
| Molecular weight | 2,000 | number average (Mn) |
| Mw/Mn | 1.64 | |
| Acryloid AT-400 | | |
| Molecular weight | 9,280 | weight average (Mw) |
| Molecular weight | 3,270 | number average (Mn) |
| Mw/Mn | 2.84 | |

The solvent fraction had the following distribution of solvent by relative evaporation rate:

| | |
|---|---|
| <50 | 84% |
| 50 to 100 | 16% |
| 101 to 250 | 0% |
| >250 | 0% |

The admixed liquid mixture was sprayed using a Nordson A7A circulating airless automatic spray gun with a Spraying Systems tip #500011 with a minimum cavity insert, which has a 9-mil orifice size and an 8-inch fan width rating.

The precursor adhesive coating composition and carbon dioxide were pressurized, mixed, heated, and sprayed in the continuous mode. An admixed liquid mixture with a carbon dioxide content of 25.5% was sprayed at a temperature of 69 C. and pressure of 600 psi, which gave a clear single-phase solution. Panels were sprayed using a Spraymation automatic sprayer, flashed, and baked in order to measure adhesive coating thickness after the adhesive is cross-linked. The adhesive polymeric coatings were uniform, clear, coherent, smooth, and bubble free. Some of the coatings had a slight haze right after being sprayed, but this disappeared quickly during the three-minute flash period. The adhesive coatings had thicknesses of from below 1.0 mil to above 2.0 mil.

Example 14

A precursor adhesive coating composition that gives a sprayable contact adhesive can be prepared from Du Pont Neoprene synthetic rubber AD-10 and Union Carbide UCAR phenolic resin CK-1634 by dissolving them in the solvents acetone, toluene, and hexane, along with American Cyanamid antioxidant 2246 and zinc oxide and magnesium oxide, in the following proportions:

| | Low Solvent Composition | Normal Composition |
|---|---|---|
| Neoprene AD-10 | 100 g | 100 g |
| Phenolic CK-1634 | 45 g | 45 g |
| acetone | 218 g | 218 g |
| toluene | 109 g | 109 g |
| hexane | 100 g | 400 g |
| water | 1 g | 1 g |
| magnesium oxide | 4 g | 4 g |
| zinc oxide | 5 g | 5 g |
| Antioxidant 2246 | 2 g | 2 g |
| Total | 584 g | 884 g |
| Solids by weight | 26.8% | 17.7% |
| Viscosity, centipoise | 3270 | 175 |

The low-solvent composition illustrates how solvent content in the precursor adhesive coating composition can be reduced by removing solvent from the normal formulation and utilizing supercritical carbon dioxide to reduce spray viscosity. In this example, a significant amount of hexane has been removed from the normal formulation, which raises the solids content and the viscosity. Supercritical carbon dioxide should have high solubility in the precursor adhesive coating composition because it has similar solubility properties to hexane. One requisite is that the concentrated precursor adhesive coating composition remain stable at the reduced solvent content. Stability can be improved by substituting more powerful solvents for those that are normally used. This liquid adhesive coating composition is applied as a random droplet pattern (non-continuous film).

What is claimed is:

1. A process for the liquid spray application of adhesive coatings to a substrate, which comprises:
   (a) forming a liquid mixture in a closed system, said liquid mixture comprising:
      (i) a solids fraction containing at least one polymeric compound capable of forming an adhesive coating on a substrate;
      (ii) a solvent fraction containing at least one active solvent in which said at least one polymeric compound is at least partially soluble and which is at least partially miscible with supercritical fluid; and
      (iii) at least one supercritical fluid, in at least an amount which when added to (i) and (ii) is sufficient to render the viscosity of said mixture to a point suitable for spray application; and
   (b) spraying said liquid mixture, forming droplets having an average diameter of 1 micron or greater, onto a substrate to form a liquid coating thereon.

2. The process of claim 1 in which said liquid mixture is formed to further contain (iv) water which is present in an amount of less than about 30% by weight based on the weight of the solvent fraction.

3. The process of claim 2 in which the liquid mixture contains less than about 20% by weight of water based on the weight of the solvent fraction.

4. The process of claim 2 in which said liquid mixture is formed to further contain a coupling solvent in which said at least one polymeric compound is at least partially soluble and which is at least partially miscible with the water.

5. The process of claims 1, 2 or 3, wherein the viscosity of the liquid mixture ranges from about 5 to about 150 cps.

6. The process of claims 1, 2 or 3, wherein the viscosity of the mixture ranges from about 10 to about 50 cps.

7. The process of claim 1 further comprising prior to step (b), heating said liquid mixture to a temperature sufficient to prevent the adverse effect caused by rapid cooling when said liquid mixture is sprayed.

8. The process of claims 1, 2 or 3, wherein the at least one supercritical fluid comprises supercritical carbon dioxide.

9. The process of claim 1, wherein said at least one polymeric compound is selected from the group consisting of thermoplastic resins, thermosetting resins, crosslinkable film forming systems, and mixtures thereof.

10. The process of claim 9, wherein said at least one polymeric compound is selected from the group consisting of cellulose derivatives, acrylic resins, vinyl resins, styrenic resins, polyesters, alkyds, polyurethanes, urethanes, polyamides, epoxies, phenolics, cellulosic esters, amino resins, natural gums, natural resins, natural rubbers and their derivatives, nitrile rubbers, styrene-butadiene rubbers, styrene-isoprene-styrene block co-polymers, polyisobutylene, thermoplastic rubbers, neoprene rubbers and interpolymers and mixtures thereof.

11. The process of claim 4, wherein the coupling solvent is selected from the group consisting of ethylene glycol ethers, propylene glycol ethers, lactams, cyclic ureas, and mixtures thereof.

12. The process of claim 4, wherein the coupling solvent is selected from the group consisting of butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol and ethoxy ethanol, n-methyl-2-pyrrolidone, dimethyl ethylene urea, and mixtures thereof.

13. The process of claim 4, wherein the weight ratio of coupling solvent to active solvent is in the range of about 1:1 to 4:1.

14. The process of claim 13, wherein the weight ratio of coupling solvent to active solvent is in the range of from 2:1 to 3.5:1.

15. The process of claim 14, wherein the weight ratio of coupling solvent to active solvent is in the range of from 2.5:1 to 3.0:1.

16. The process of claim 1, wherein said at least one active solvent is selected from the group consisting of ketones, esters, ethers, glycol ethers, glycol ether esters, alcohols, aromatic hydrocarbons, aliphatic hydrocarbons, nitroalkanes, unsaturated hydrocarbons, halocarbons, and mixtures thereof.

17. The process of claim 1, wherein the substrate is selected from the group consisting of cloth, masonry, stone, metal, wood, glass, ceramic, leather, rubbers, paper and plastic.

18. The process of claim 1, further comprising curing the liquid coating on the substrate.

19. The process of claim 1, wherein the liquid adhesive coating applied to the substrate is a substantially continuous film.

20. The process of claim 19 having a solvent fraction composition containing a weight % solvent distribution and relative evaporation rates of:

| Wt. % of Total Solvent Fraction | RER |
| --- | --- |
| 30-100% | <50 |
| 0-70% | 50-100 |
| 0-40% | 101-250 |
| <10% | >250. |

21. The process of claim 20 having a solvent fraction composition of:

| Wt. % of Total Solvent Fraction | RER |
| --- | --- |
| 40-100% | <50 |
| 0-60% | 50-100 |
| 0-30% | 101-250 |
| <5% | >250. |

22. The process of claim 1, wherein the liquid adhesive coating applied to the substrate is in a substantially discontinuous random droplet pattern.

23. The process of claim 22 having a solvent fraction composition containing a weight % solvent distribution and relative evaporation rates of:

| Wt. % of Total Solvent Fraction | RER |
| --- | --- |
| 0-40% | <100 |
| 0-70% | 101-250 |
| 30-100% | >250. |

24. The process of claim 23 having a solvent fraction composition of:

| Wt. % of Total Solvent Fraction | RER |
| --- | --- |
| 0-30% | <100 |
| 0-60% | 101-250 |
| 40-100% | >250. |

25. The process of claim 1 in which the liquid mixture is electrically charged by a high electrical voltage.

26. The process of claim 25, wherein the high electrical voltage ranges from about 30 to about 150 kilovolts.

27. The process of claim 1, wherein the predominant polymeric compound has a Mw/Mn ratio of less than about 4.

28. The process of claim 27, wherein the predominant polymeric compound has a Mw/Mn ratio of less than about 3.

29. The process of claim 28, wherein the predominant polymeric compound has a Mw/Mn ratio of less than about 2.

30. A process for the liquid spray application of adhesive coatings to a substrate, which comprises:
   (a) forming a liquid mixture in a closed system, said liquid mixture comprising:
      (i) a solids fraction containing at least one polymeric compound capable of forming an adhesive coating on a substrate;
      (ii) a solvent fraction containing at least one active solvent in which said polymeric compound is at least partially soluble and which is at least partially miscible with the supercritical fluid of (iv) and containing at least one coupling solvent in which said at least one polymeric compound is at least partially soluble and which is at least partially miscible with water;
      (iii) water, which is present in an amount of less than about 30% by weight based on the weight of the solvent fraction; and
      (iv) at least one supercritical fluid, in at least an amount which when added to (i), (ii), and (iii), is sufficient to render the viscosity of said mixture to a point suitable for spray application; and
   (b) spraying said liquid mixture, forming droplets having an average diameter of 1 micron or greater, onto a substrate to form a liquid coating thereon.

31. A process for the liquid spray application of adhesive coatings to a substrate, which comprises:
   (a) forming a liquid mixture in a closed system, said liquid mixture comprising:
      (i) a solids fraction containing at least one polymeric compound capable of forming an adhesive coating on a substrate;
      (ii) a solvent fraction containing at least one active solvent in which said at least one polymeric compound is at least partially soluble and which is at least partially miscible with supercritical fluid; and
      (iii) at least one supercritical fluid, in at least an amount which when added to (i) and (ii) is sufficient to render the viscosity of said mixture to a point suitable for spray application; and
   (b) spraying said liquid mixture onto a substrate to form a liquid adhesive coating thereon by passing the mixture under pressure through an orifice into the environment of the substrate to form a liquid spray having droplets with an average diameter of 1 micron or greater.

32. The process of claim 31 which further comprises forming a liquid mixture which also contains water in an amount of less than about 30% by weight based on the weight of the solvent fraction.

33. The process of claim 32, wherein the solvent fraction further comprises at least one coupling solvent in which said polymeric compound is at least partially soluble and which is at least partially miscible with the water.

34. The process of claim 33, wherein the weight ratio of coupling solvent to active solvent is in the range of from about 1:1 to 4:1.

35. The process of claim 34, wherein the weight ratio of the coupling solvent to active solvent is in the range of from about 2:1 to 3.5:1.

36. The process of claims 32, 33 or 34, wherein the orifice size ranges from about 0.004 to about 0.072 inch in diameter.

37. The process of claim 36, wherein the orifice size ranges from about 0.004 to about 0.025 inch in diameter.

38. The process of claim 37, wherein the orifice size ranges from about 0.007 to about 0.015 inch in diameter.

39. The process of claims 32, 33 or 34, wherein the spray pressure ranges from about the critical pressure of the supercritical fluid to about 5000 pounds per square inch.

40. The process of claim 39, wherein the spray pressure is below about 3000 pounds per square inch.

41. The process of claims 32, 33 or 34, wherein the viscosity of the liquid mixture is less than about 300 centipoise at spray temperature.

42. The process of claim 41, wherein the viscosity of the liquid mixture ranges from about 5 to about 150 centipoise at spray temperature.

43. The process of claim 42, wherein the viscosity of the liquid mixture ranges from about 10 to about 50 centipoise at spray temperature.

44. The process of claim 32 further comprising, prior to step (b), heating said liquid mixture to a temperature sufficient to prevent the adverse effect caused by rapid cooling when said liquid mixture is sprayed.

45. The process of claim 44, wherein the liquid temperature ranges from about 35° to about 90° centigrade.

46. The process of claim 45, wherein the liquid temperature ranges from about 45° to about 75° centigrade.

47. The process of claims 32, 33 or 34 wherein supercritical fluid comprises supercritical carbon dioxide fluid.

48. The process of claims 32, 33 or 34 wherein supercritical fluid comprises supercritical nitrous oxide fluid.

49. The process of claim 32 wherein said at least one polymeric component is selected from the group consisting of thermoplastic resins, thermosetting resins, crosslinkable film forming systems, and mixtures thereof.

50. The process of claim 49, wherein said at least one polymeric component is selected from the group consisting of cellulose derivatives, acrylic resins, vinyl resins, styrenic resins, polyesters, alkyds, polyurethanes, urethanes, polyamides, epoxies, phenolics, cellulosic esters, amino resins, natural gums, natural resins, natural rubbers and their derivatives, nitrile rubbers, styrene-butadiene rubbers, styrene-isoprene-styrene block copolymers, polyisobutylene, thermoplastic rubbers, neoprene rubbers and interpolymers and mixtures thereof.

51. The process of claim 32, further comprising, prior to Step (b), filtering said liquid mixture to remove particulates that would plug said orifice.

52. The process of claim 32, further comprising, prior to step (b), promoting turbulent or agitated flow of said liquid mixture to aid atomization of said liquid spray.

53. The process of claim 32, further comprising utilizing jets of compressed gas to assist formation and atomization of said liquid spray and to modify the shape of said liquid spray.

54. The process of claim 53, wherein said compressed gas is compressed air.

55. The process of claim 54, wherein said compressed air has lowered oxygen content to reduce flammability of said liquid spray.

56. The process of claim 53, wherein said compressed gas is compressed carbon dioxide.

57. The process of claim 53, wherein said compressed gas is selected from the group consisting of compressed nitrogen, helium, argon, xenon, and mixtures thereof.

58. The process of claim 53, wherein the pressure of said compressed gas ranges from about 5 to about 80 pounds per square inch.

59. The process of claim 58, wherein the pressure of said compressed gas ranges from about 5 to about 20 pounds per square inch.

60. The process of claim 53, wherein said compressed gas is heated to supply heat to the liquid spray to prevent an adverse effect caused by rapid cooling when said liquid mixture is sprayed.

61. The process of claim 60, wherein the temperature of said compressed gas ranges from about 35° to about 90° centigrade.

62. The process of claim 61, wherein the temperature of said compressed gas ranges from about 45° to about 75° centigrade.

63. The process of claim 32, wherein the substrate is selected from the group consisting of metal, wood, glass, plastic, paper, cloth, ceramic, masonry, stone, cement, asphalt, rubber, and composite materials thereof.

64. The process of claim 32, further comprising curing said liquid coating on said substrate.

65. The process of claim 32, wherein the liquid adhesive coating applied to the substrate is a substantially continuous film.

66. The process of claim 65 having a solvent fraction composition containing a weight % solvent distribution and relative evaporation rates of:

| Wt. % of Total Solvent Fraction | RER |
|---|---|
| 30–100% | <50 |
| 0–70% | 50–100 |
| 0–40% | 101–250 |
| <10% | >250. |

67. The process of claim 66 having a solvent fraction composition of:

| Wt. % of Total Solvent Fraction | RER |
|---|---|
| 40–100% | <50 |
| 0–60% | 50–100 |
| 0–30% | 101–250 |
| <5% | >250. |

68. The process of claim 65, wherein the substantially continuous film is obtained by maintaining a relative linear traversal rate between the spray orifice and the substrate of less than about 1 m/sec.

69. The process of claim 32, wherein the liquid adhesive coating applied to the substrate is in a substantially discontinuous random droplet pattern.

70. The process of claim 69 having a solvent fraction composition containing a weight % solvent distribution and relative evaporation rates of:

| Wt. % of Total Solvent Fraction | RER |
|---|---|
| 0–40% | <100 |
| 0–70% | 101–250 |
| 30–100% | >250. |

71. The process of claim 70 having a solvent fraction composition of:

| Wt. % of Total Solvent Fraction | RER |
|---|---|
| 0–30% | <100 |
| 0–60% | 101–250 |
| 40–100% | >250. |

72. The process of claim 69, wherein the substantially discontinuous random droplet pattern is obtained by maintaining a relative linear traversal rate between the spray orifice and the substrate of at least about 1 m/sec.

73. The process of claim 32 in which the liquid mixture is electrically charged by a high electrical voltage.

74. The process of claim 73, wherein the high electrical voltage ranges from about 30 to about 150 kilovolts.

* * * * *

UNITED STATES PATENT AND TRADEMARK OFFICE
CERTIFICATE OF CORRECTION

PATENT NO. : 5,066,522

DATED : November 19, 1991

INVENTOR(S) : Thomas A. Cole; Kenneth A. Nielsen

It is certified that error appears in the above-identified patent and that said Letters Patent is hereby corrected as shown below:

Column 17, line 12, "o" should read --of--.

Column 17, line 33, "propxy" should read --propoxy--.

Column 17, line 35, "blycol" should read --glycol--.

Column 18, line 50, "form" should read --from--.

Column 46, lines 33-34, "with a Spraying Systems tip #500011 with a minimum cavity insert," should read --#152-200 with Nordson spray tip #0004/08,--.

Column 46, lines 40-45, "a temperature of 67 C. and a pressure of 1900 psig, which gave a clear single-phase solution but was near the solubility limit. Panels were sprayed using a Spraymation automatic sprayer, flashed, and baked, in order to measure adhesive coating thickness after the adhesive is cross-linked" should read --pressure of 1550 psig and temperature of 59 C, which gave a clear single-phase solution. The viscosity of the admixed liquid mixture was about 30 centipoise. Test panels were sprayed and flashed and, in order to measure adhesive coating thickness after the adhesive is cross-linked, baked at a temperature of 120 C for twenty minutes--.

UNITED STATES PATENT AND TRADEMARK OFFICE
CERTIFICATE OF CORRECTION

PATENT NO. : 5,066,522
DATED : November 19, 1991
INVENTOR(S) : Thomas A. Cole; Kenneth A. Nielsen It is certified that error appears in the above-identified patent and that said Letters Patent is hereby corrected as shown below:

Column 46, lines 47-48, "1.5 to 2.8 mil." should read --0.8 to 1.7 mil.--

Column 51, line 38 "3ethoxypropionate" should read --3-ethoxypropionate.--

Column 54, line 35, "Aroplaz 6026-A6-80" should read --Aroplaz 6025-A6-80--.

Column 57, line 17 "600" should read --1600--.

Signed and Sealed this

Twenty-second Day of June, 1993

Attest:

MICHAEL K. KIRK

Attesting Officer

Acting Commissioner of Patents and Trademarks